(12) United States Patent
Chernyak et al.

(10) Patent No.: US 12,395,683 B2
(45) Date of Patent: Aug. 19, 2025

(54) METHOD AND APPARATUS FOR HADAMARD TRANSFORM DOMAIN FILTERING OF THE VIDEO SIGNAL WITH VARIOUS BIT DEPTH

(71) Applicant: HUAWEI TECHNOLOGIES CO., LTD., Shenzhen (CN)

(72) Inventors: Roman Igorevich Chernyak, Moscow (RU); Kamilla Railevna Davletshina, Munich (DE); Sergey Yurievich Ikonin, Moscow (RU); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 18/172,174

(22) Filed: Feb. 21, 2023

(65) Prior Publication Data

US 2023/0199227 A1    Jun. 22, 2023

Related U.S. Application Data

(63) Continuation of application No. PCT/RU2021/050266, filed on Aug. 18, 2021.

(30) Foreign Application Priority Data

Aug. 18, 2020    (WO) ................ PCT/RU2020/000439

(51) Int. Cl.
*H04N 19/80*    (2014.01)
*H04N 19/176*    (2014.01)
(Continued)

(52) U.S. Cl.
CPC ........... *H04N 19/80* (2014.11); *H04N 19/176* (2014.11); *H04N 19/182* (2014.11); *H04N 19/60* (2014.11)

(58) Field of Classification Search
CPC .. H04N 19/117; H04N 19/176; H04N 19/182; H04N 19/60; H04N 19/80; H04N 19/82
(Continued)

(56) References Cited

U.S. PATENT DOCUMENTS

2015/0304664 A1* 10/2015 Li ..................... H04N 19/105
                                                                375/240.02
2020/0288158 A1*  9/2020 Rusanovskyy ....... H04N 19/176
2020/0349741 A1* 11/2020 Hinnerson ............. H04N 19/88

FOREIGN PATENT DOCUMENTS

WO    WO-2020009617 A1 *  1/2020    ............... G06F 1/03
WO       2020055288 A2       3/2020

OTHER PUBLICATIONS

"Text of ISO/IEC FDIS 23094-1 Essential Video Coding", 130. MPEG Meeting; Apr. 20, 2020-Apr. 24, 2020; Alpbach; (Motion Picture Expert Group or ISO/IEC JTC1/SC29/WG11 ), No. n19229 Apr. 30, 2020 (Apr. 30, 2020), XP030285492, Part1 (Year: 2020).*

(Continued)

*Primary Examiner* — William C Vaughn, Jr.
*Assistant Examiner* — Astewaye Gettu Zewede
(74) *Attorney, Agent, or Firm* — Leydig, Voit & Mayer, Ltd.

(57) ABSTRACT

A method of coding is implemented by a decoding device, the method includes: receiving a bitstream, and obtaining from the bitstream, a first luma bit depth value of luma samples of a current picture. The method also includes performing a Hadamard Transform Domain Filtering (HTDF) post reconstruction filtering of a block of the current picture by using a lookup table based on the obtained first luma bit depth value.

19 Claims, 16 Drawing Sheets

(51) Int. Cl.
*H04N 19/182* (2014.01)
*H04N 19/60* (2014.01)

(58) Field of Classification Search
USPC .......................................................... 375/240
See application file for complete search history.

(56) References Cited

OTHER PUBLICATIONS

"Text of ISO/IEC FDIS 23094-1 Essential Video Coding", 130. MPEG Meeting; Apr. 20, 2020-Apr. 24, 2020; Alpbach; (Motion Picture Expert Group or ISO/IEC JTC1/SC29/WG11 ), No. n19229 Apr. 30, 2020 (Apr. 30, 2020), XP030285492,Part2 (Year: 2020).*
"Text of ISO/IEC FDIS 23094-1 Essential Video Coding", 130. MPEG Meeting; Apr. 20, 2020-Apr. 24, 2020; Alpbach; (Motion Picture Expert Group or ISO/IEC JTC1/SC29/WG11 ), No. n19229 Apr. 30, 2020 (Apr. 30, 2020), XP030285492,Part3 (Year: 2020).*
"Text of ISO/IEC FDIS 23094-1, Information technology—General video coding—Part 1: Essential Video Coding" MPEG Meeting; (Motion Picture Expert Group or ISO/IEC JTC1/SC29/WG11), XP030285492, Total 345 pages (Apr. 2020).

* cited by examiner

800

810, determining a bit depth value of luma samples of a current picture

830, performing an Hadamard Transform Domain Filtering (HTDF) post reconstruction filtering of a block of the current picture by using a lookup table(s) based on the obtained luma bit depth value, or performing an Hadamard Transform Domain Filtering (HTDF) post reconstruction filtering of a block of the current picture based on a formula which is associated with the luma bit depth value

Fig. 8

METHOD AND APPARATUS FOR HADAMARD TRANSFORM DOMAIN FILTERING OF THE VIDEO SIGNAL WITH VARIOUS BIT DEPTH

CROSS-REFERENCE TO RELATED APPLICATIONS

This application is a continuation of International Application No. PCT/RU2021/050266, filed on Aug. 18, 2021, which claims priority to International Patent Application No. PCT/RU2020/000439, filed on Aug. 18, 2020. The disclosures of the aforementioned applications are hereby incorporated by reference in their entireties.

FIELD

Generally, the present disclosure relates to the field of video coding. More specifically, the present disclosure relates to a filter for video coding and to a method for filtering reconstructed image blocks, a program implementing such method, as well as an encoding apparatus and a decoding apparatus comprising said filter for video coding.

BACKGROUND

Digital video has been widely used since the introduction of DVD-discs. Before transmission, the video is encoded and transmitted using a transmission medium. The viewer receives the video and uses a viewing device to decode and display the video. Over the years the quality of video has improved, for example, because of higher resolutions, color depths and frame rates. This has led to larger data streams that are nowadays commonly transported over internet and/or over mobile communication networks.

Higher resolution videos, however, typically require more bandwidth, as they carry more information. In order to reduce bandwidth requirements, video coding standards involving compression of the video have been introduced. When the video is encoded, the bandwidth requirements (or the corresponding memory requirements in case of storage) are reduced. Often, this reduction comes at the cost of quality. Thus, the video coding standards try to find a balance between bandwidth requirements and quality.

As there is a continuous need for improving quality and reducing bandwidth requirements, solutions that maintain the quality with reduced bandwidth requirements or improve the quality while maintaining the bandwidth requirements are continuously searched. Furthermore, sometimes compromises may be acceptable. For example, it may be acceptable to increase the bandwidth requirements if the quality improvement is significant.

The High Efficiency Video Coding (HEVC) is an example of a video coding standard that is commonly known to persons skilled in the art. In HEVC, a coding unit (CU) is split into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Image filtering is frequently used to emphasize certain features of an image or to enhance the objective or perceptual quality of the filtered image. Image filtering has to deal with various sources of noise. Accordingly, various approaches for quality enhancement have been proposed and are currently in use. For example, in an adaptive Loop filter (ALF) method, each reconstructed frame is divided into a set of small macro-blocks (super-pixels) and each macro-block is filtered by the adaptive loop filter in that each pixel of the filtered reconstructed frame is a weighted sum of several pixels in the connected area of the pixel from the reconstructed frame around the position of the generating filtered pixel. Weighting coefficients (also referred to as filter coefficients) have property of central symmetry and are transmitted from the encoder to the decoder side. Edges often have a big size and therefore the number of transmitted weighting coefficients can become too large for an efficient processing. A large number of weighting coefficients requires a complex rate-distortion optimization (RDO) at the encoder side for decreasing the number of weighting coefficients for transmission. On the decoder side, ALF requires implementation of universal multipliers and these multipliers should be reloaded for each 2×2 pixel block.

Thus, the inventors have recognized that there is a need for an improved filter and a method allowing to improve the prediction quality with low complexity and, thus, increase the video coding efficiency.

SUMMARY

Embodiments of the disclosure provide an improved filter and method allowing to improve the filtering efficiency with limited complexity and, thus, increase the video coding efficiency. The method according to the present disclosure can be applied for wide range of video signal representation within encoder implementations. The method allows to utilize the filtering process for various bit depths in integer range from 8 to 16 bits.

According to a first aspect, the disclosure relates to a method of coding implemented by a decoding device, comprising:
  receiving a bitstream;
  obtaining from the bitstream, a first luma bit depth value of luma samples of a current picture;
  performing an Hadamard Transform Domain Filtering (HTDF) post reconstruction filtering of a block of the current picture by using a lookup table (LUT) based on the obtained first luma bit depth value.

From above, it allow utilize HTDF beneficial effect for a wide range or different bit depths without storing any additional LUTs designed for each supported bit depth value. This allows to support various bit depth video signal by HTDF post reconstruction filter without changes in a given LUT.

In a possible implementation form, performing an Hadamard Transform Domain Filtering (HTDF) post reconstruction filtering of a block of the current picture by using a lookup table based on the obtained first luma bit depth value comprises:
  obtaining a second luma bit depth value by adding 8 to the first luma bit depth value obtained from the bitstream; and
  performing an Hadamard Transform Domain Filtering (HTDF) post reconstruction filtering of a block of the current picture by using a lookup table (LUT) based on the obtained second luma bit depth value.

The obtained first luma bit depth value from the bitstream is different from the second luma bit depth value. The second luma bit depth value is the real luma bit depth value so there is a mapping between the first and second luma bit depth values and the second luma bit depth value. The second luma bit depth value is not obtaining from the bitstream directly. The second luma bit depth value is obtained by adding 8 to the first luma bit depth value obtained from the bitstream.

In a possible implementation form, the step of performing an HTDF post reconstruction filtering of a block of the current picture by using a lookup table based on the obtained second luma bit depth value comprises:
  if second luma bit depth value is less than 10, left shifting an input value of the LUT by [10−second luma bit depth value] bits; otherwise, right shifting the input value of the LUT by [second luma bit depth value−10] bits.

This further explains that the step of performing an Hadamard Transform Domain Filtering (HTDF) post reconstruction filtering of a block of the current picture by using a lookup table based on the obtained second luma bit depth value can be done performed by left shifting the input value of the LUT by a number of bits calculated as [10−second luma bit depth value] if the second luma bit depth value is less than 10, and right shifting the input value of the LUT by a number of bits calculated as [second luma bit depth value−10] otherwise, in particular, if the second luma bit depth value is larger than 10.

In a possible implementation form, the lookup table is predefined or designed for a third luma bit depth value.

In a possible implementation form, the lookup table is used for a plurality of obtained second luma bit depth values, in particular for obtained second luma bit depth values smaller than the third luma bit depth value and/or not smaller than the third luma bit depth value.

In a possible implementation form, the third obtained luma bit depth value is 10.

In a possible implementation form, the obtained second luma bit depth value is one of 8-16 bits.

In a possible implementation form, the lookup table is used for 10 bits luma bit depth value, 8 bits luma bit depth value, 12 bits luma bit depth value and/or other bit depth value.

In a possible implementation form, the performing an Hadamard Transform Domain Filtering (HTDF) post reconstruction filtering of a block of the current picture by using the lookup table based on the obtained first luma bit depth value, comprises:
  when the obtained second luma bit depth value is not a third luma bit depth value, performing an Hadamard Transform Domain Filtering (HTDF) post reconstruction filtering of the block of the current picture by using the lookup table, wherein an input of the lookup table is normalized based on the obtained second luma bit depth value, and an output of the lookup table is normalized based on the obtained second luma bit depth value, wherein the obtained second luma bit depth value is obtained based on the obtained first luma bit depth value; and/or
  when the obtained first luma bit depth value is the third luma bit depth value, performing an Hadamard Transform Domain Filtering (HTDF) post reconstruction filtering of a block of the current picture by using the lookup table, wherein no normalization is performed for an input of the lookup table, and no normalization is performed for an output of the lookup table.

It can be understood that, even if the bit depth value is different from the first bit depth representation (such as 10 bits bit depth), an input (e.g. LUT element index) of the lookup table(s) is normalized to the first bit depth representation (such as 10 bits bit depth) and an output (e.g. the filtered Hadamard spectrum components) of the lookup table(s) is normalized to the obtained internal bit depth value (such as 8 bits bit depth or 12 bits bit depth).

Aspects of the present disclose utilize the HTDF beneficial effect for a wide range or different bit depths without storing any additional LUTs specifically designed for each supported bit depth value.

In a possible implementation form, the step of performing an HTDF post reconstruction filtering of a block of the current picture, comprises:
  when at least one condition is satisfied, performing an HTDF post reconstruction filtering of a block of the current picture using one or more predefined HTDF lookup tables based on a formula which is associated with the first luma bit depth value; or
  when at least one condition is satisfied, performing an Hadamard Transform Domain Filtering (HTDF) post reconstruction filtering of a block of the current picture by using lookup table(s) based on the obtained first luma bit depth value.

In a possible implementation form, the condition is based on a comparison result between a scaled Hadamard spectrum component and a predefined threshold value;
  or
  when the condition is satisfied, comprises: when a scaled Hadamard spectrum component is less than a predefined threshold value.

In a possible implementation form, the step of performing an HTDF post reconstruction filtering of a block of the current picture, comprises:
  loading a current pixel of a reconstructed block or an extended reconstructed block including a current pixel and neighboring pixels of the current pixel according to a predefined scan template;
  obtaining Hadamard spectrum components (fHad) by performing a Hadamard transform for the current pixel or the current pixel and the neighboring pixels;
  obtaining filtered Hadamard spectrum components (fHadFilt) based on the obtained Hadamard spectrum components by using the lookup table based on the obtained second luma bit depth value, wherein an input of the lookup table(s) is normalized based on the obtained second luma bit depth value, and an output of the lookup table is normalized based on the obtained second luma bit depth value, to obtain the filtered Hadamard spectrum components (fHadFilt);
  obtaining filtered pixels by performing an inverse Hadamard transform transform for the filtered Hadamard spectrum components; and
  generating a filtered reconstructed block based on the filtered pixels.

In a possible implementation form, the step of obtaining filtered Hadamard spectrum components, comprises:
  performing a conditional check of normalized Hadamard spectrum components and a predefined threshold value;
  when said condition is satisfied, deriving output filtered Hadamard spectrum components by using the predefined lookup table based on a LUT element index; and performing a normalization of the output filtered Hadamard spectrum components to obtain the filtered Hadamard spectrum components, wherein the nomalization process of the output filtered Hadamard spectrum components is performed based on the obtained second luma bit depth value.

In a possible implementation form, the lookup table is obtained based on a quantization parameter (Qp) of the block.

In a possible implementation form, if the obtained second luma bit depth value is 8 bits, the following formula is used to obtain the filtered Hadamard spectrum components:

$$fHadFilt[i] = \begin{cases} fHad[i]; \text{Abs}(fHad[i]) << 2 >= aTHR \\ bLUT[(fHad[i] << 2 + (1 << (tblShift - 1))) >> tblShift] >> 2; fHad[i] > 0, \text{Abs}(fHad[i]) << 2 < aTHR \\ -(bLUT[((-fHad[i]) << 2 + (1 << (tblShift - 1))) >> tblShift] >> 2); fHad[i] <= 0, \text{Abs}(fHad[i]) << 2 < aTHR \end{cases}$$

wherein i=1 . . . 3, and variables THR and tblShift are derived based on the luma quantization parameter $Qp_Y$,
wherein fHad[i] represent the Hadamard spectrum component,
fHadFilt represent the filtered Hadamard spectrum components,
aTHR represent a predefined threshold value.

In a possible implementation form, if the obtained second luma bit depth is 12 bits, the following formula is used $$fHadFilt[i] = \begin{cases} fHad[i]; \text{Abs}(fHad[i]) << 2 >= aTHR \\ bLUT[(fHad[i] << 2 + (1 << (tblShift - 1))) >> tblShift] >> 2; fHad[i] > 0, \text{Abs}(fHad[i]) << 2 < aTHR \\ -(bLUT[((-fHad[i]) << 2 + (1 << (tblShift - 1))) >> tblShift] >> 2); fHad[i] <= 0, \text{Abs}(fHad[i]) << 2 < aTHR \end{cases}$$

wherein i=1 . . . 3, and variables THR and tblShift are derived based on the luma quantization parameter $Qp_Y$;
wherein fHad[i] represent the Hadamard spectrum component,
fHadFilt represent the filtered Hadamard spectrum components,
aTHR represent a predefined threshold value.

In a possible implementation form, the following formula is used in the following way depending on the bit depth (bitDepth$_y$) value:

If $bitDepth < 10$ $bdShift = 10 - bitDepth$ $fHadFilt[i] =$ $$\begin{cases} fHad[i]; \text{Abs}(fHad[i]) << bdShift >= aTHR \\ bLUT[(fHad[i] << bdShift + (1 << (tblShift - 1))) >> tblShift] >> bdShift; fHad[i] > 0, \text{Abs}(fHad[i]) << bdShift < aTHR \\ -(bLUT[((-fHad[i]) << bdShift + (1 << (tblShift - 1))) >> tblShift] >> bdShift); fHad[i] <= 0, \text{Abs}(fHad[i]) << bdShift < aTHR \end{cases}$$

otherwise $bdShift = bitDepth - 10$ $fHadFilt[i] =$ $$\begin{cases} fHad[i]; \text{Abs}(fHad[i]) >> bdShift >= aTHR \\ bLUT[(fHad[i] >> bdShift + (1 << (tblShift - 1))) >> tblShift] << bdShift; fHad[i] > 0, \text{Abs}(fHad[i]) >> bdShift < aTHR \\ -(bLUT[((-fHad[i]) >> bdShift + (1 << (tblShift - 1))) >> tblShift] << bdShift); fHad[i] <= 0, \text{Abs}(fHad[i]) >> bdShift < aTHR \end{cases}$$

wherein i=1 . . . 3, and variables THR and tblShift are derived based on the luma quantization parameter $Qp_Y$;
wherein fHad[i] represent the Hadamard spectrum component,
fHadFilt represent the filtered Hadamard spectrum components,
aTHR represent a predefined threshold value.

According to a second aspect, the disclosure relates to a decoding apparatus for decoding a block from a received bitstream, wherein the decoding apparatus comprises processing circuitry for carrying out the method according to the first aspect or any implementation form thereof.

According to a third aspect, the disclosure relates to a computer program product comprising program code for performing the method according to the first aspect of any implementation form thereof when executed on a computer or a processor.

According to a fourth aspect, the disclosure relates to a decoder, comprising:

one or more processors; and
a non-transitory computer-readable storage medium coupled to the processors and storing programming for execution by the processors, wherein the programming, when executed by the processors, configures the decoder to carry out the method according to the first aspect or any implementation form thereof.

According to a fifth aspect, the disclosure relates to a non-transitory computer-readable medium carrying a program code which, when executed by a computer device, causes the computer device to perform the method according to the first aspect or any implementation form thereof.

According to a sixth aspect, the disclosure relates to a decoder, comprising:

receiving means for receiving a bitstream;
obtaining means for obtaining from the bitstream, a first luma bit depth value of luma samples of a current picture; and filtering means for performing an Hadamard Transform Domain Filtering post reconstruction filtering of a block of the current picture by using a lookup table based on the obtained first luma bit depth value.

BRIEF DESCRIPTION OF THE DRAWINGS

Further embodiments of the disclosure will be described with respect to the following figures, wherein:

FIG. 8 is a flow diagram illustrating an encoding method, according to an embodiment of the present disclosure;

In the various figures, identical reference signs will be used for identical or functionally equivalent features.

Figure 14:
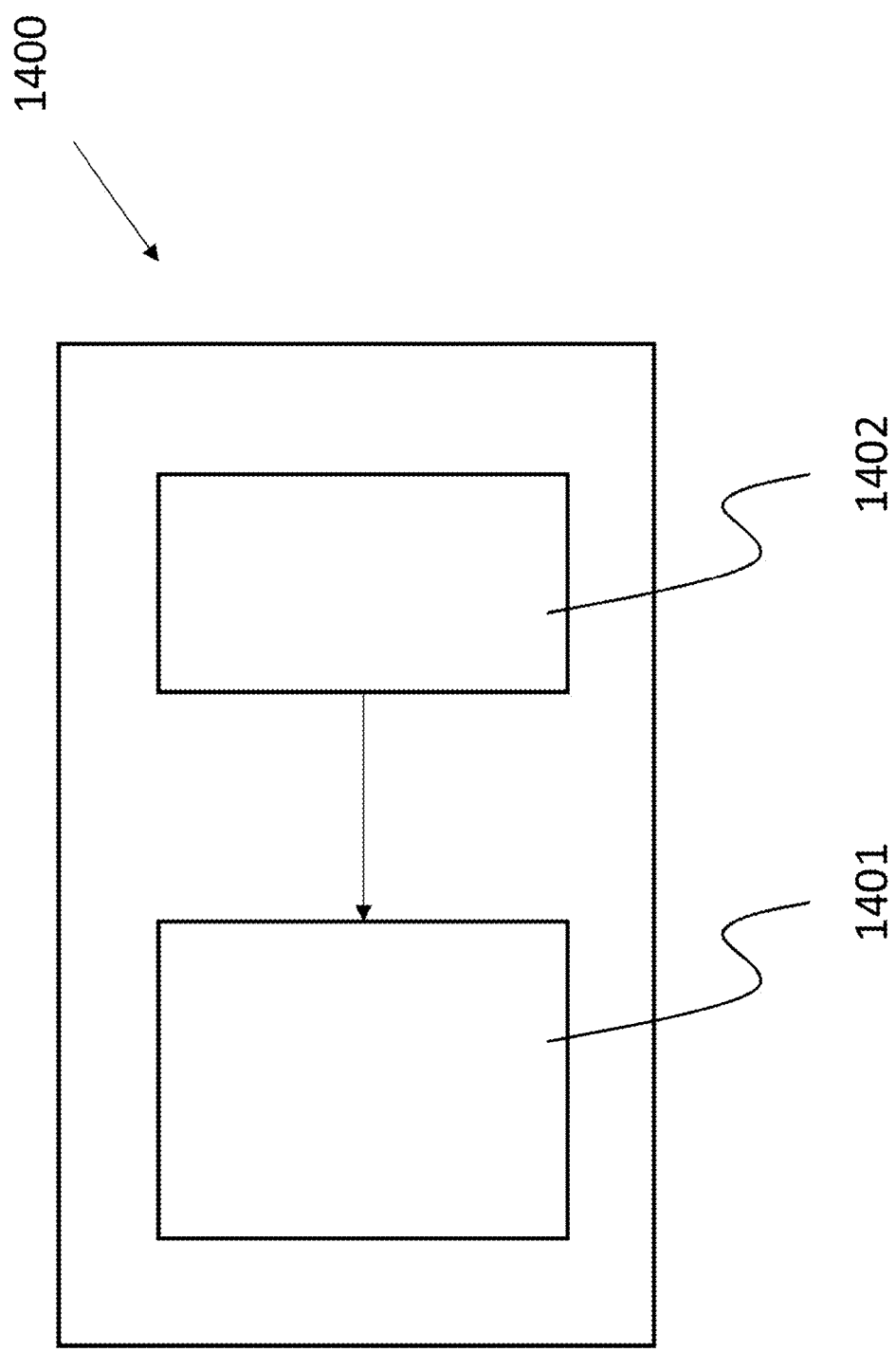

FIG. 14 is a block diagram showing a decoder according to an embodiment, according to an embodiment of the present disclosure.

Figure 15:
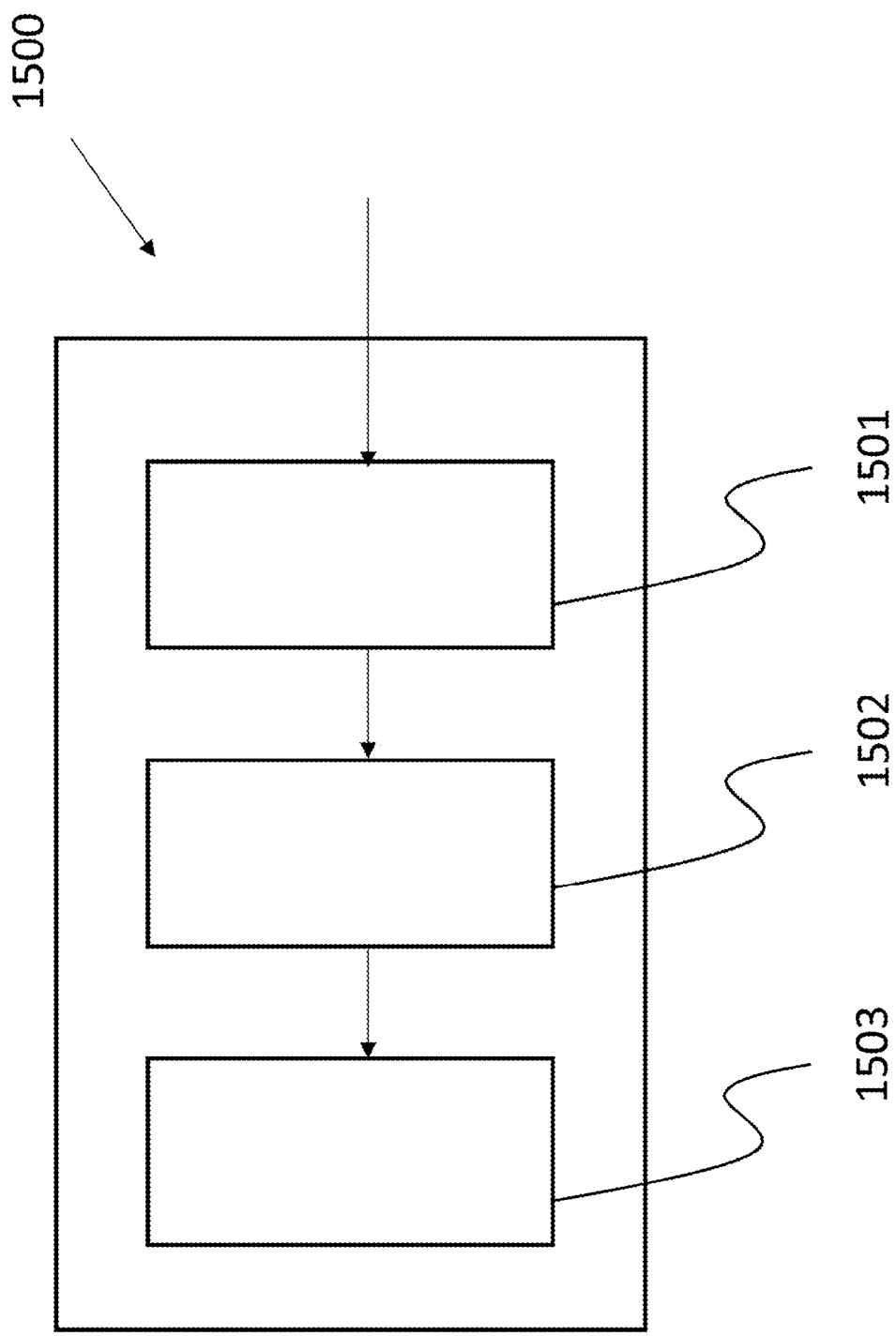

FIG. 15 is a block diagram of a decoder according to another, according to an embodiment of the present disclosure.

DETAILED DESCRIPTION

In the following description, reference is made to the accompanying drawings, which form part of the disclosure, and in which are shown, by way of illustration, exemplary aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if an exemplary method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
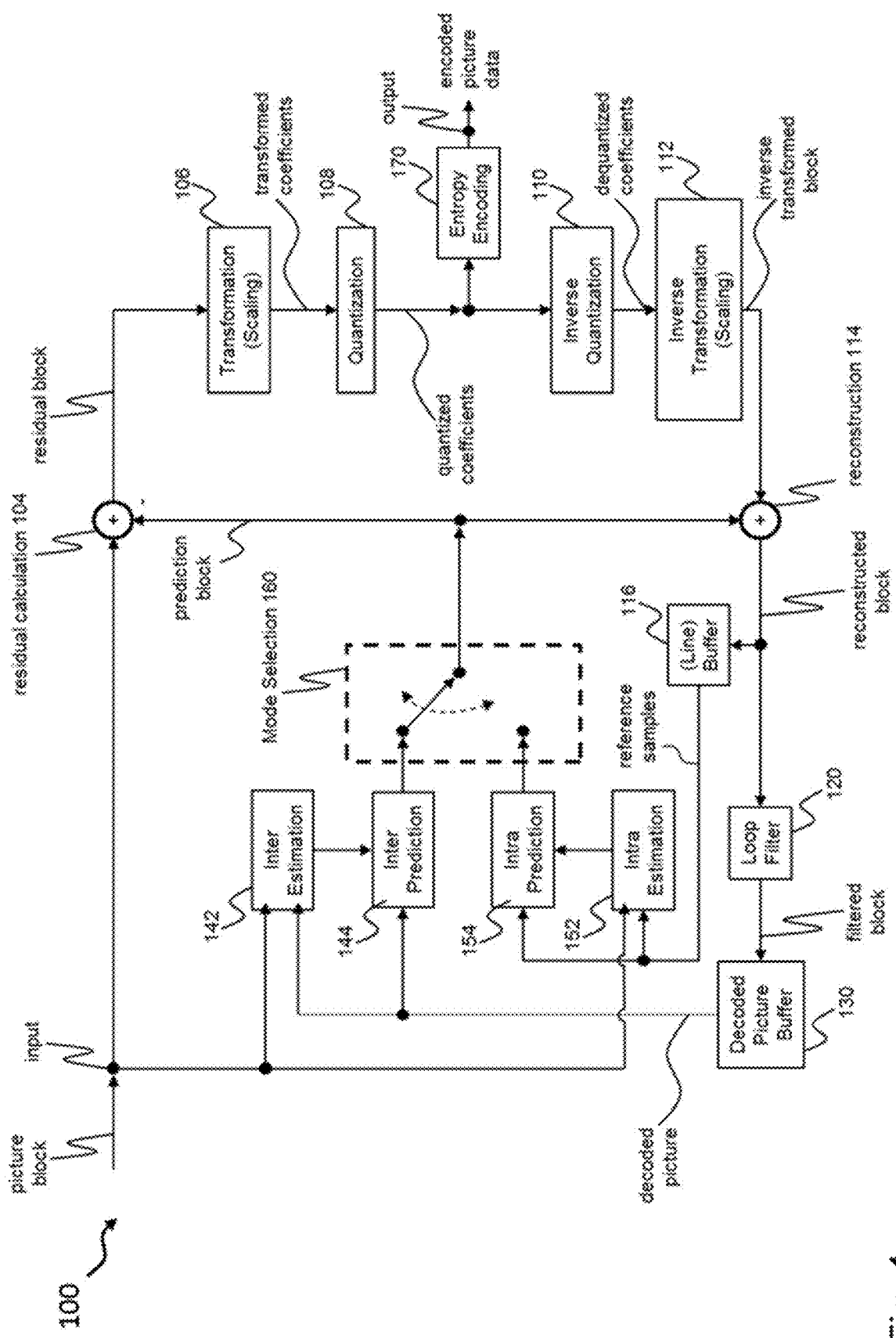
FIG. 1 shows a schematic diagram illustrating an encoding apparatus according to an embodiment comprising a filter, according to an embodiment of the present disclosure.

FIG. 1 shows an encoding apparatus 100 according to an embodiment comprising a filter 120 according to an embodiment. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, coding tree units, coding units, prediction units and/or prediction blocks.

The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ. The term "block" in this disclosure may refer to an M×N (M-column by N-row) array of samples, or an M×N array of transform coefficients.

A frame of video may be regarded as a (digital) picture which can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. It is understood that the present disclosure is applicable to samples (pixels) of any one or more (or all) color components.

It is noted that the term video coding generally applies for video encoding and/or video decoding.

In the exemplary embodiment shown in FIG. 1, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 1 comprises an intra prediction unit 154 for intra prediction. An intra frame can be decoded without information from other frames. The intra prediction unit 154 can perform the intra prediction of a block on the basis of information provided by the intra estimation unit 152. It is noted that in another example, the intra estimation unit 152 and intra prediction unit 154 may be not separately presented in the encoding apparatus 100, for example, the intra estimation unit 152 and intra prediction unit 154 may be integrated together.

In an example, the intra prediction unit 154 may be responsible for reference samples derivation that comprises logic for checking availability of neighboring reconstructed samples and retrieving the neighboring reconstructed samples (e.g. form the line buffer 116 in some specific implementations) if they are available, and substituting them by other available (neighboring) samples if they are not available. These reference samples are used as an input for intra prediction.

The blocks of subsequent frames following the first intra frame can be coded using inter or intra prediction, as selected by a mode selection unit 160. To this end, the encoding apparatus 100 shown in FIG. 1 further comprises an inter prediction unit 144. Generally, the inter prediction unit 144 can be configured to perform motion compensation of a block based on motion estimation provided by the inter estimation unit 142. It is noted that in another example, the inter estimation unit 142 and inter prediction unit 144 may be not separately presented in the encoding apparatus 100, for example, the inter estimation unit 142 and inter prediction unit 144 may be integrated together.

Furthermore, in the hybrid encoder embodiment shown in FIG. 1, a residual calculation unit 104 determines the difference between the original block and its prediction, i.e. the residual block defining the prediction error of the intra/inter picture prediction. This residual block is transformed by the transformation unit 106 (for instance using a DCT) and the transformation coefficients are quantized by the quantization unit 108. The output of the quantization unit 108 as well as the coding or side information provided, for instance, by the intra prediction unit 154, the inter prediction unit 144 and the filter 120 are further encoded by an entropy encoding unit 170.

A hybrid video encoder usually duplicates the decoder processing such that both will generate the same predictions. Thus, in the embodiment shown in FIG. 1 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by the filter 120, which will be described in more detail below. The final picture is stored in the decoded picture buffer 130 and can be used for the inter prediction of subsequent frames.

Figure 2:
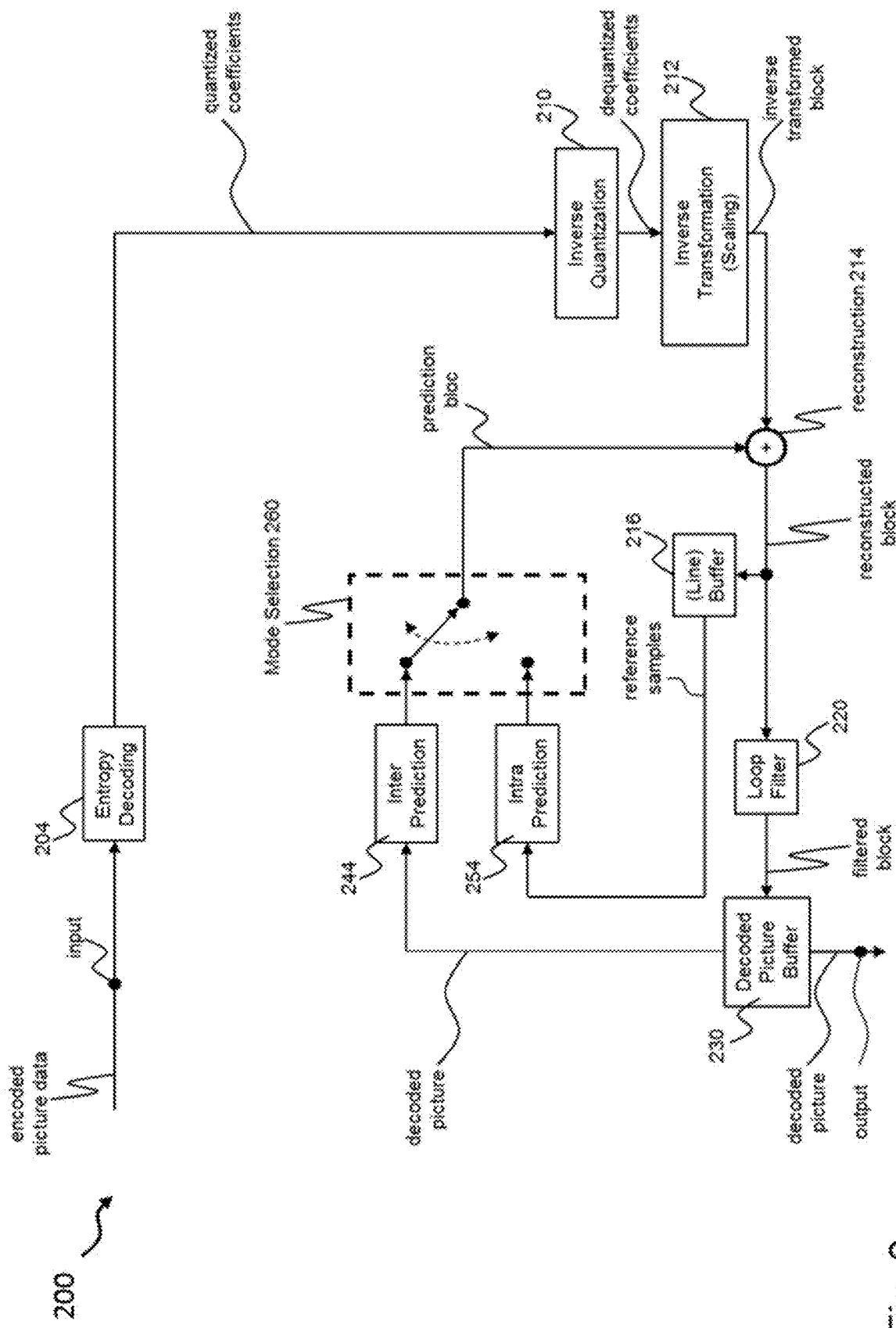
FIG. 2 shows a schematic diagram illustrating a decoding apparatus according to an embodiment comprising a filter, according to an embodiment of the present disclosure.

FIG. 2 shows a decoding apparatus 200 according to an embodiment comprising a filter 220 according to an embodiment. The decoding apparatus 200 is configured to decode a block of a frame of an encoded video signal. In the embodiment shown in FIG. 2 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for an intra prediction unit 254 and an inter prediction unit 244 as well as other components of the decoding apparatus 200, such as the filter 220. Generally, the intra prediction unit 254 and the inter prediction unit 244 of the decoding apparatus 200 shown in FIG. 2 are selected by a mode selection unit 260 and function in the same way as the intra prediction unit 154 and the inter prediction unit 144 of the encoding apparatus 100 shown in FIG. 1, so that identical predictions can be generated by the encoding apparatus 100 and the decoding apparatus 200. The intra prediction unit 154, 254 may be responsible for reference samples derivation that comprises logic for checking availability of neighboring reconstructed samples and retrieving neighboring reconstructed samples (e.g. form the line buffer 216, 116 in some specific implementation) if they are available and substitution them by other available neighboring samples if they are not available. These reference samples are used as an input for intra prediction. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the filter 220 for inter prediction.

As already described above, the filter 120, 220 may be used at a frame level, for example, the filter 120, 220 may be configured to process a reconstructed frame from a decoded reconstructed video stream for generating a filtered reconstructed frame, where the reconstructed frame includes a plurality of blocks. The filter 120, 220 may be also used at a block level after block reconstruction (or post-reconstruction filter) without waiting for a whole frame, for example, the filter 120, 220 may be configured to process a reconstructed block for generating a filtered reconstructed block and also providing filtered reconstructed samples to the line buffer 1016, 1116, as it exemplary illustrated on FIG. 10 or filtered reconstructed samples to the line buffer 1116, as it exemplary illustrated on FIG. 11, where the reconstructed block includes a plurality of pixels.

Figure 10:
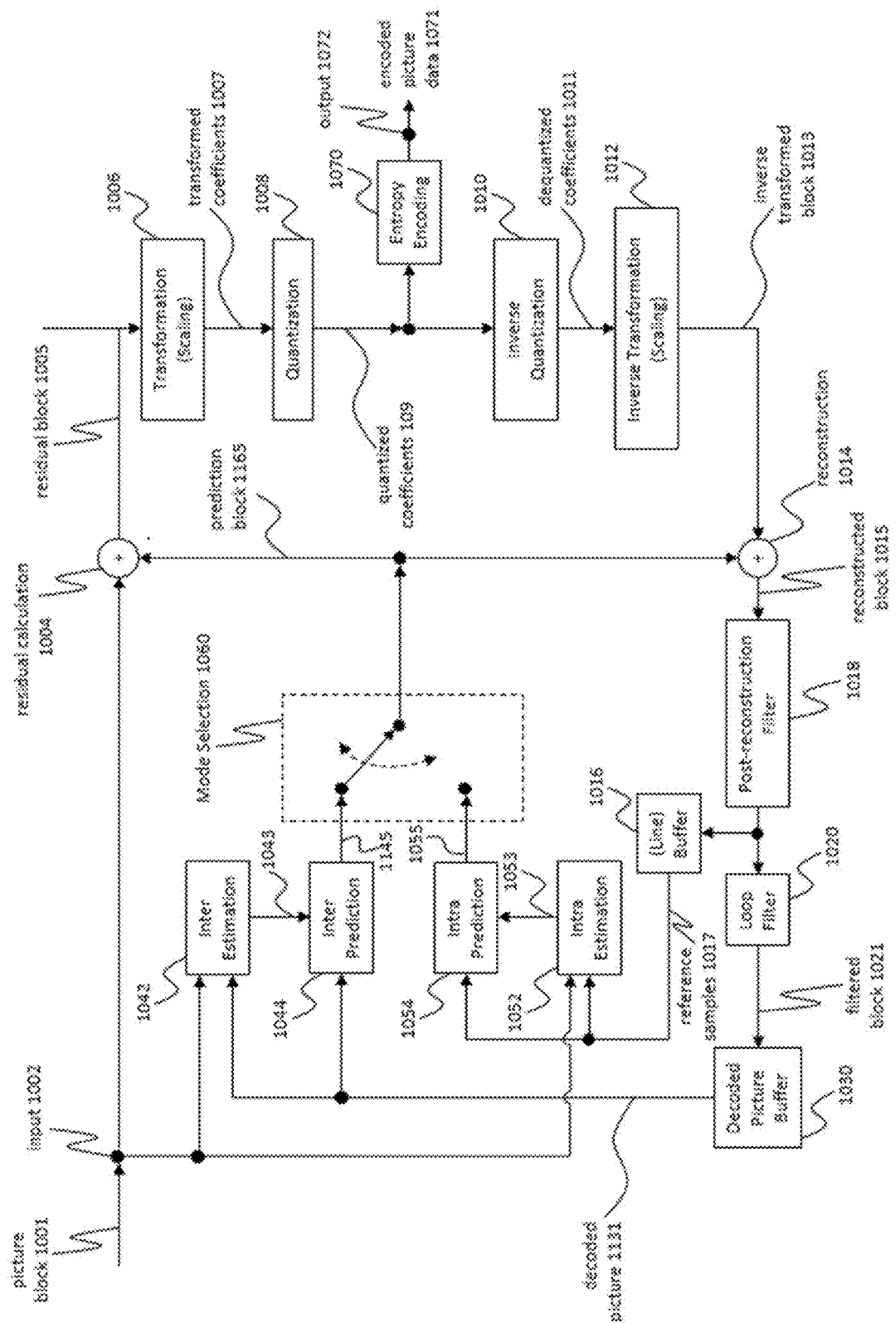
FIG. 10 shows a schematic diagram illustrating an encoding apparatus according to another embodiment comprising a filter, according to another embodiment of the present disclosure.

FIG. 10 shows an example of an encoding apparatus 1000 according to another embodiment, where the filter is applied as a post-reconstruction filter 1018 after block reconstruction, such as immediately after block reconstruction. Result of a reconstruction unit 1014 can be provided to the post-reconstruction filter 1018. Then, the result of the post-reconstruction filter 1018 can be provided to a line buffer 1016 and is further processed by a loop filter 1020 or directly provided to a decoded picture buffer 1030.

Figure 11:
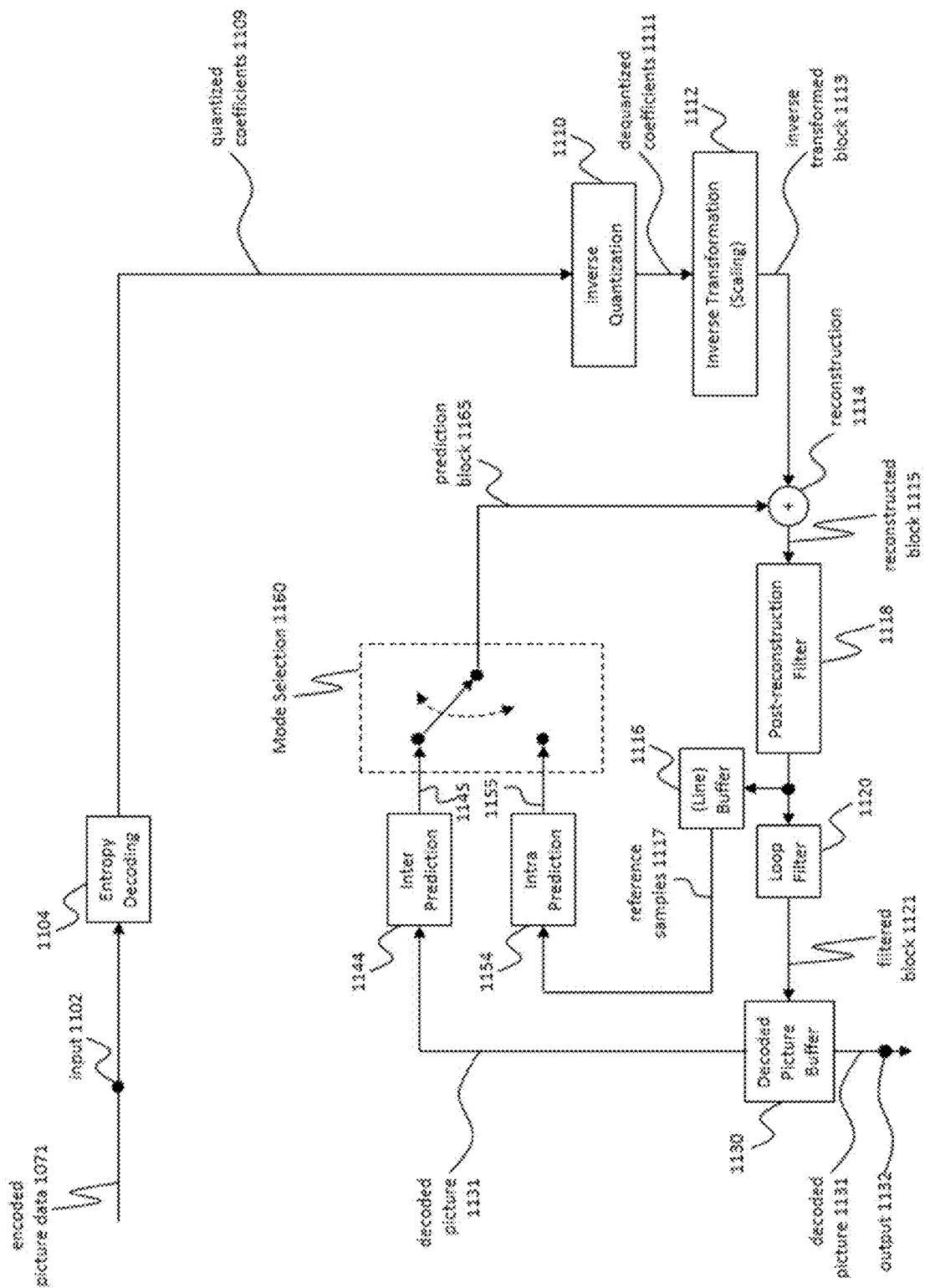
FIG. 11 shows a schematic diagram illustrating a decoding apparatus according to another embodiment comprising a filter, according to another embodiment of the present disclosure.

FIG. 11 shows an example of a decoding apparatus 1100 according to another embodiment, where the filter is applied as a post-reconstruction filter 1118 after block reconstruction, such as immediately after block reconstruction. Result of a reconstruction unit 1114 can be provided to the post-reconstruction filter 1118. Then, the result of the post-reconstruction filter 1118 can be provided to a line buffer 1116 and is further processed by a loop filter 1120 or directly provided to a decoded picture buffer 1130.

The filter 120, 220, 1018, 1118 comprises, in an embodiment, one or more processors (or one or more processing units or processing circuitry). As will be explained in more detail below, the one or more processors (or one or more processing units or processing circuitry) is/are configured to: performing an HTDF post reconstruction filtering of a block of the current picture based on a formula which is associated with a luma bit depth value, where the bit depth value of luma samples of a current picture is obtained from the bitsream.

At the first step of processing, all pixels inside a reconstructed block can be processed independently from each other. For processing of pixel r(0), neighboring pixels are used. For example, as illustrated on FIG. 3A, pixels r(1) to r(7) are used, and pixels r(0) to r(7) form one processing group.

Figure 3A:
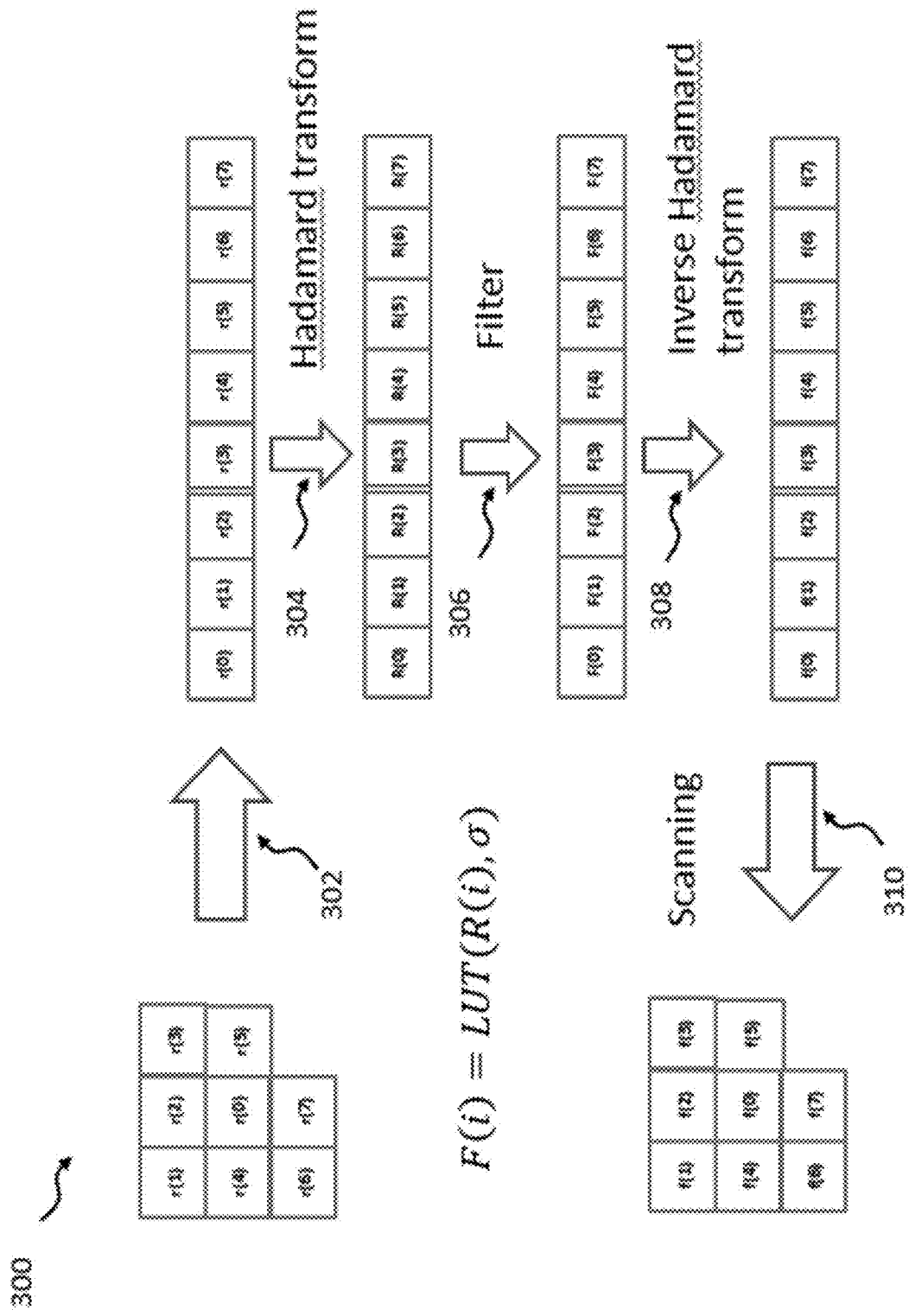
FIG. 3A shows schematic diagram illustrating aspects of a filtering process implemented in a filter, according to an embodiment of the present disclosure.
Figure 3B:
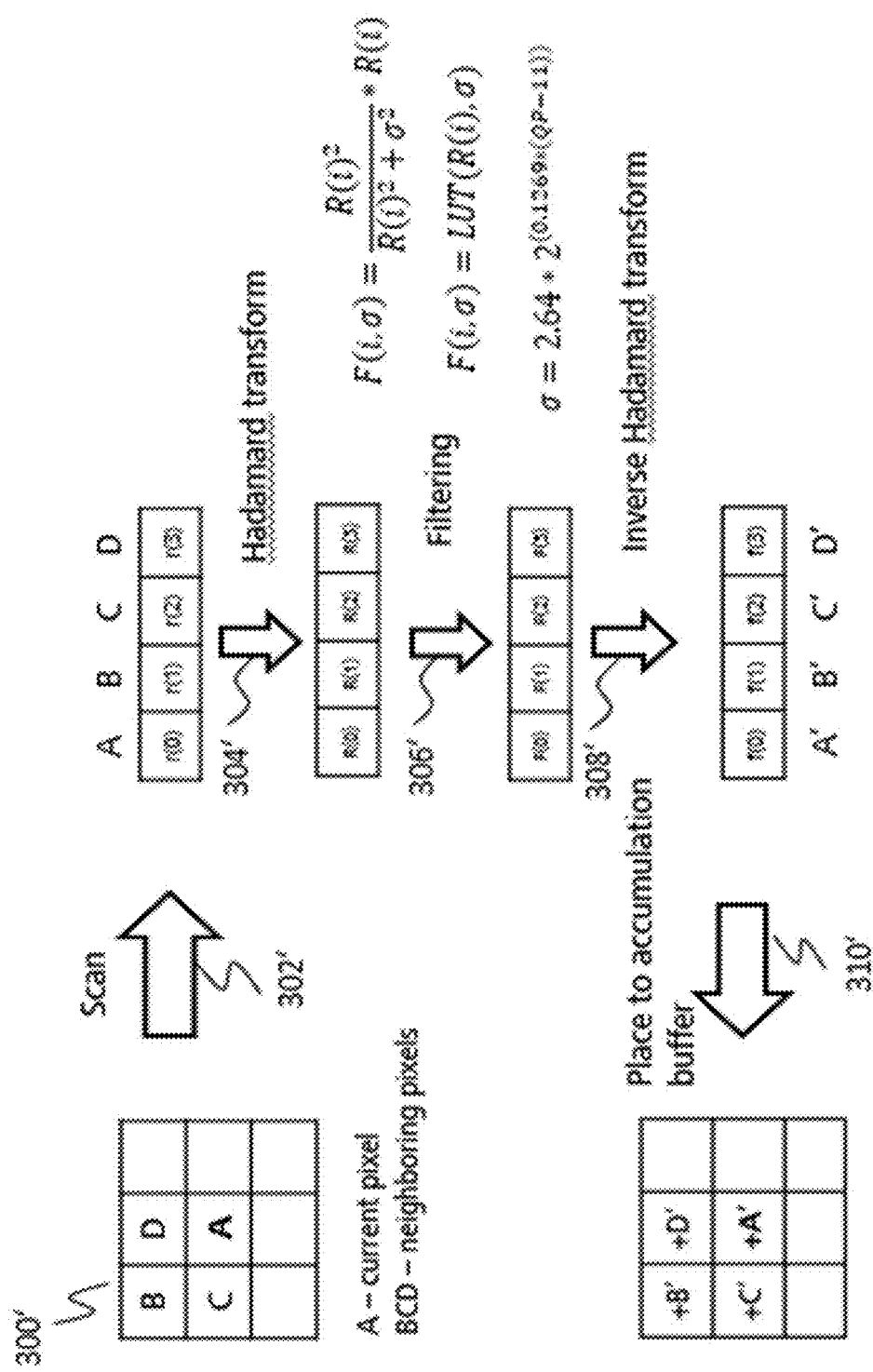
FIG. 3B shows a schematic diagram illustrating aspects of a filtering process implemented in a filter, according to an embodiment of the present disclosure.

FIG. 3A or 3B shows a schematic diagram 300 (or 300') illustrating aspects of a filtering process implemented in a filter according to an embodiment. At step 302 (or 302'), a current pixel and its neighboring pixels from a reconstructed block are loaded to a linear buffer, such as a linear buffer 116, 216, 1016, 1116 according to a predefined scan template. At step 304 (or 304'), a 1D transform is performed for pixel r(0) and its neighboring pixels r(1) to r(7) in the linear buffer to obtain spectrum components R:

$$R = 1D\_Transform(r)$$

As an example, the 1D transform may be a Hadamard transform.

At step 306 (or 306'), filtering is performed in frequency domain based on multiplication (denoted here as "*") of each spectrum component R(i) by a corresponding gain coefficient G(i, σ) to obtain a filtered spectrum components F(i): F(i)=R(i)*G(i, σ).

The set of gain coefficients for all spectrum components is a frequency impulse response of the filter.

As described above, in an example, the gain coefficient G(i, σ) depends on the corresponding spectrum component R(i) and a filtering parameter, such as σ.

In another example, the gain coefficient G(i, σ) depends on one or more filtering parameters and one or more of the corresponding spectrum components. In other example, the respective gain coefficient may depend on the one or more filtering parameters, and the corresponding spectrum component as well as neighboring spectral components to the left and to the right of the spectrum component. If each gain coefficient G(i, σ) is a function of a spectrum component of the reconstructed block and the filtering parameter, the gain coefficient G(i, σ) can be described by the following formula as an example:

$$G(i, \sigma) = \frac{R(i)^2}{R(i)^2 + m * \sigma^2}$$

where (i) is an index of a spectrum component, R(i) is the spectrum component corresponding to (i) index, G(i, σ) is the gain coefficient corresponding to R(i), σ is the filtering parameter, and m is a normalization constant equal to number of spectrum components. For example, m corresponds to the length of the 1D transformation. An exemplary and limiting value for m is 4. However, the present disclosure is applicable to any size of the 1D transformation. Different spectrum components may have a same gain coefficient, or may have different gain coefficients.

Parameter σ as the filtering parameter, may be derived from a codec quantization parameter (QP) on the encoder and decoder sides, for example, using the following formula:

$$\sigma = k * 2^{(n*(QP-s))},$$

wherein k, n and s are constants having values as example: k=2.64, n=0.1296, s=11.

These values are only exemplary and may differ in some implementations.

Different spectrum components may have a same filtering parameter, or may have different filtering parameters.

According to the method 300 as illustrated in FIG. 3A (or the method 300' in FIG. 3B), gain coefficient for each frequency is derived from spectrum component of the reconstructed pixels. Therefore, the method 300 (or 300') does not need transmission of filtering parameters and can be applied for any reconstructed block without additional signaling.

Spectrum gain coefficient is less 1, so filtering can be implemented based on a short look up table (LUT) reading according to the following formula:

$$F(i, \sigma) = \begin{cases} R(i), \text{Abs}(R(i)) \geq THR \\ LUT(R(i), \sigma), R(i) > 0 \\ -LUT(-R(i), \sigma), R(i) \leq 0 \end{cases}$$

where $$LUT(R_i, \sigma) = \frac{R_i^3}{R_i^2 + m * \sigma^2}, (i)$$

is an index of a spectrum component, R(i) is the spectrum component corresponding to index (i), σ is the filtering parameter, and THR is a threshold, m is normalization constant equal to number of spectrum components. F(i, σ) represents an (i)-th filtered spectrum component, filtered with a filter parameterized with the parameters σ.

As an example, THR may be calculated from following formula, where C is a value close to 1, for example, 0.9.

$$\frac{THR^2}{THR^2 + m * \sigma^2} = C$$

After filtering in frequency domain, inverse 1D transform is performed for the filtered spectrum components F at step 308 to obtain filtered pixels f:

$$f = 1D\_Inverse\_Transform(F)$$

At step 310, the result of the inverse 1D transform is placed to linear buffer of filtered reconstructed pixels.

At step 312 (not shown in FIG. 3A or 3B), a filtered reconstructed block is generated based on the filtered pixels estimated in previous processing steps.

As shown in FIG. 3A as an embodiment, after filtering step 306, the filtered pixel f(0) is placed to its original position according to the predefined scan template. Other filtered samples f(1)-f(7) are not used. At another embodiment, more than one filtered pixels, for example, all filtered pixels from the linear buffer of filtered samples are added to an accumulation buffer according to the predefined scan template used at step 302 (or 302') of FIG. 3A or 3B. The accumulation buffer should be initialized by zero before the filtering step. At the last normalization step, final filtered pixels are obtained as accumulated values in the accumulation buffer divided by number of pixels added to a current position of the accumulation buffer, in other words, number of pixels values added to current position of accumulation buffer on previous processing steps. Then the filtered reconstructed block is generated based on the final filtered pixels.

If 1D Hadamard transform is used, and a filtered pixel is placed to its original position according to the predefined scan template, then the following pseudo-code describes filtering process of method 300:

```
// reconstructed pixels scan
const int x0 = pIn[p0];
const int x1 = pIn[p1];
const int x2 = pIn[p2];
const int x3 = pIn[p3];   // p0-p3 define scan pattern
// 1D forward Hadamard transform
const int y0 = x0 + x2;
const int y1 = x1 + x3;
const int y2 = x0 - x2;
const int y3 = x1 - x3;
const int t0 = y0 + y1;
const int t1 = y0 - y1;
const int t2 = y2 + y3;
const int t3 = y2 - y3;
// frequency domain filtering
const int z0 = pTbl[t0];
const int z1 = pTbl[t1];
const int z2 = pTbl[t2];
const int z3 = pTbl[t3];
// backward Hadamard transform
const int iy0 = z0 + z2;
const int iy1 = z1 + z3;
const int iy2 = z0 - z2;
const int iy3 = z1 - z3;
    // output filtered pixel
pOut[p0_out] = iy0 + iy1;
```

If 1D Hadamard transform is used, and more than one filtered pixels from linear buffer of filtered samples are added to accumulation buffer, then the following pseudo-code describes filtering process of this scenario:

```
// reconstructed pixels scan
const int x0 = pIn[p0];
const int x1 = pIn[p1];
const int x2 = pIn[p2];
const int x3 = pIn[p3];   // p0-p3 define scan pattern
// 1D forward Hadamard transform
const int y0 = x0 + x2;
const int y1 = x1 + x3;
const int y2 = x0 - x2;
const int y3 = x1 - x3;
const int t0 = y0 + y1;
const int t1 = y0 - y1;
const int t2 = y2 + y3;
const int t3 = y2 - y3;
// frequency domain filtering
const int z0 = pTbl[t0];
const int z1 = pTbl[t1];
const int z2 = pTbl[t2];
const int z3 = pTbl[t3];
// backward Hadamard transform
const int iy0 = z0 + z2;
const int iy1 = z1 + z3;
const int iy2 = z0 - z2;
const int iy3 = z1 - z3;
// filtered pixels accumulation
pOut[p0] += iy0 + iy1   // p0-p3 define scan pattern
pOut[p1] += iy0 - iy1
pOut[p2] += iy2 + iy3
pOut[p3] += iy2 - iy3
```

As an alternative embodiment the accumulation buffer should be initialized by unfiltered pixel values multiplied by maximum number of pixel values to be added in the block. The maximum number of pixel values to be added in the block is defined based on scan template. Indeed scan template defines number of pixel values added for each position. Based on that the maximum number from all positions in the block can be selected and used during accumulation buffer initialization. Then during each accumulation step unfiltered pixel value is subtracted from corresponding filtered value and added to accumulation buffer:

```
// filtered pixels accumulation
pOut[p0] += iy0 + iy1 - x0
pOut[p1] += iy0 - iy1 - x1
pOut[p2] += iy2 + iy3 - x2
pOut[p3] += iy2 - iy3 - x3
```

This embodiment allows to avoid storing number of pixels added to current position and allows to replace division and multiplication by shift operation at the last normalization step and accumulation buffer initialization step correspondingly if the maximum number of pixel values added is power of 2 e.g. 2, 4, 8 etc.

For each pixel inside of a reconstructed block, a scan template is chosen based on position of filtering pixel inside reconstructed block for steps 302 and 310. Scan template is chosen to guarantee all pixels be inside reconstructed CU and placed (located) close to processing pixel. Arbitrary scan order can be used inside template. For example, the predefined scan template is defined as set of spatial or raster offsets relative to a position of the current pixel inside the reconstructed block, where offsets point to neighbor pixels are inside the reconstructed block.

It is noted that for the related part of the method 300' as illustrated in FIG. 3B, reference may be made to the method 300 as illustrated in FIG. 3A.

Figure 4:
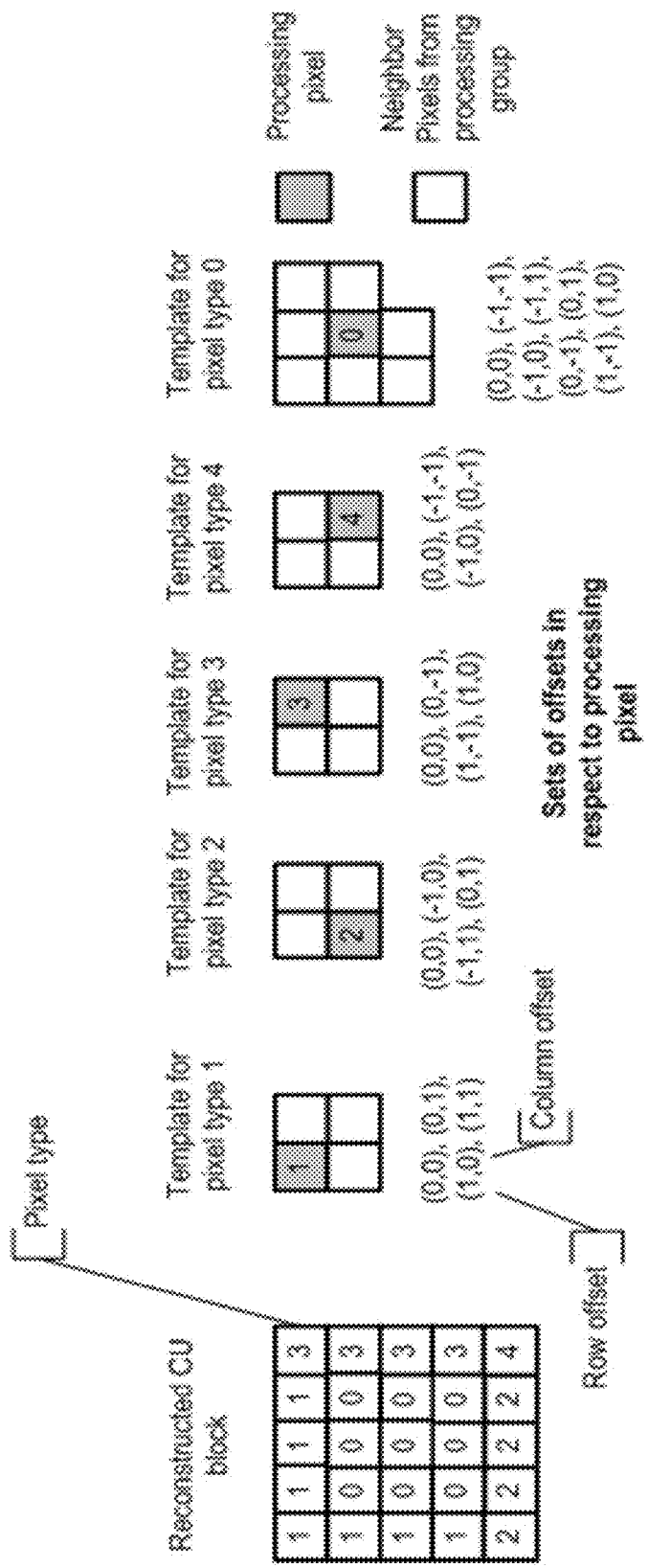
FIG. 4 illustrates templates for different pixel position inside square reconstructed block, according to an embodiment of the present disclosure.

FIG. 4 illustrates templates for different pixel position inside square reconstructed block (square CU reconstructed block). According to this figure, boundary pixels can be filtered based on 4 point transform and central pixels can be filtered based on 8 point transform.

For rectangular reconstructed blocks, wherein size of one side is more size of other side the scan should be performed along long side. For example for horizontal rectangular block the following scan order can be used (0,−3), (0,−2), (0,−1), (0,0), (0,1), (0,2), (0,3), (0,4), where in each pair (y, x) x is horizontal offset and y is vertical offset in respect to position of filtering pixel inside filtering reconstructed block.

The described filter can be selectively applied depending on conditions:
- for reconstructed blocks with non-zero residual signal;
- depending on block size, e.g. for small reconstructed block (minimal size is less than threshold);
- depending on an aspect ratio of the reconstructed block;
- depending on prediction mode (Intra or Inter) of the reconstructed block; or
- for any combination of described above conditions.

Filter parameter sigma and scan pattern may vary depending on conditions listed above.

Figure 5:
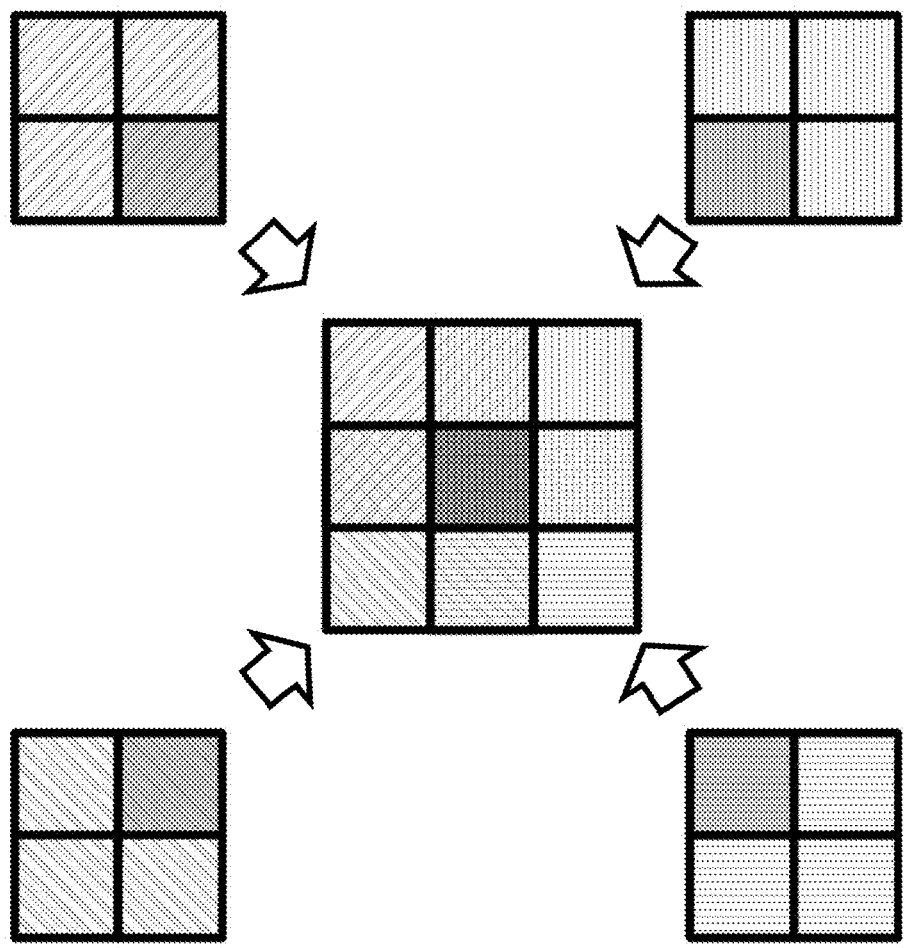
FIG. 5 illustrates equivalent filter shape for one pixel, according to an embodiment of the present disclosure.

FIG. 5 illustrates equivalent filter shape considering one pixel inside of current block for exemplary scan template (0,0), (0,1), (1,0), (1,1). For the filtering of current pixel square area of 3×3 pixels is used (current pixel is marked by dark-gray color in the center of 3×3 square). Filtered pixel is obtained by combining transform domain filtered samples from four 2×2 processing groups, in other words, filtered pixel is obtained by combining transform domain filtered samples from four processing groups, where each processing group being the shape/size of 2×2. It can be understood that if current pixel is located in block border (e.g. top border) top left and top right 2×2 processing groups are unavailable and only two 2×2 processing groups (bottom left and bottom right) can be used for filtering. Furthermore, if current pixel is located in block corner (e.g. top-left corner) only one 2×2 processing group (bottom right) can be used for filtering.

In an example, to increase quality of filtering near block edges and unify processing by using same 2×2 groups for border and corner pixels, the current block can be padded by additional samples.

Figure 6:
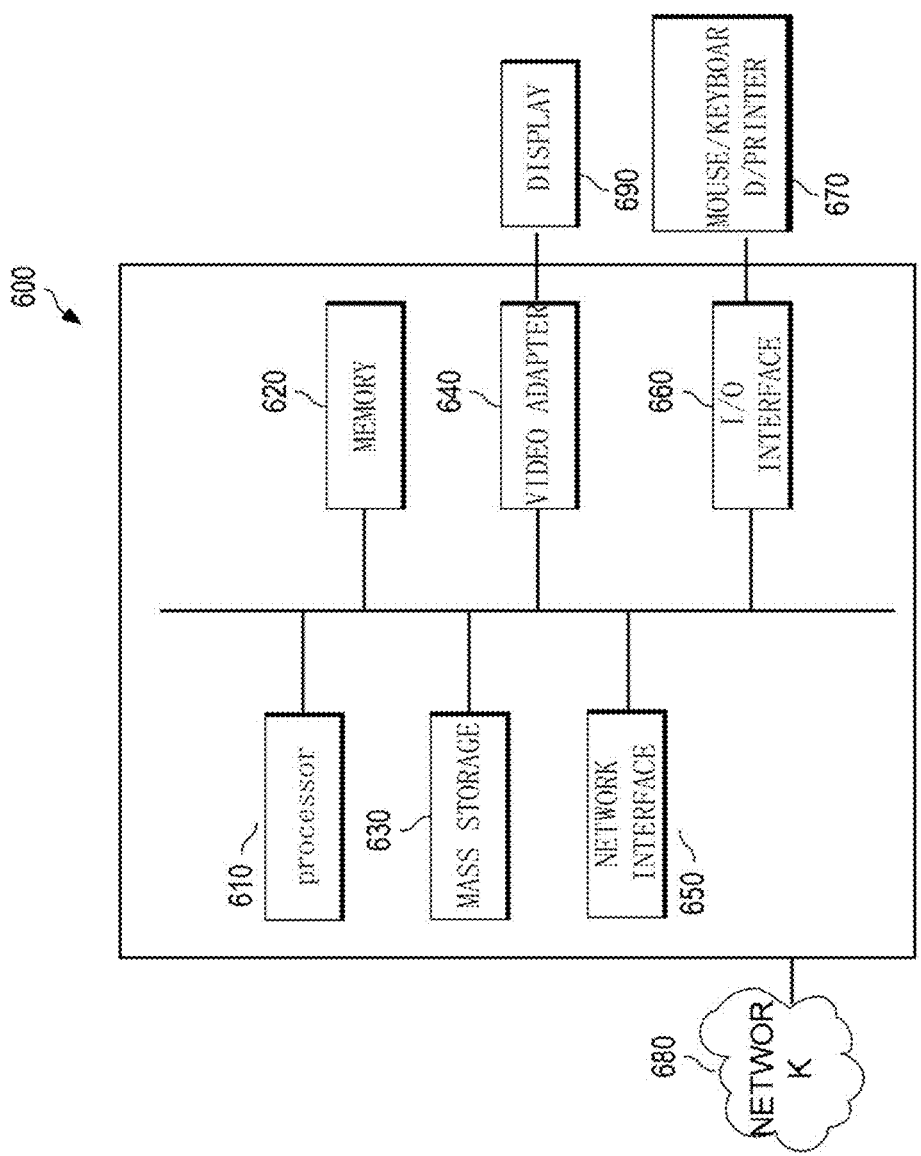
FIG. 6 is a schematic diagram illustrating an exemplary structure of an apparatus, according to an embodiment of the present disclosure.

FIG. 6 is a block diagram of an apparatus 600 that can be used to implement various embodiments. The apparatus 600 may be the encoding apparatus as shown in FIG. 1 or 10 and the decoding apparatus as shown in FIG. 2 or 11. Additionally, the apparatus 600 can host one or more of the described elements. In some embodiments, the apparatus 600 is equipped with one or more input/output devices, such as a speaker, microphone, mouse, touchscreen, keypad, keyboard, printer, display, and the like. The apparatus 600 may include one or more central processing units (CPUs) 610, a memory 620, a mass storage 630, a video adapter 640, and an I/O interface 660 connected to a bus. The bus is one or more of any type of several bus architectures including a memory bus or memory controller, a peripheral bus, a video bus, or the like.

The CPU 610 may have any type of electronic data processor. The memory 620 may have, or be, any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage 630 includes any type of storage device that stores data, programs, and other information and to make the data, programs, and other information accessible via the bus. The mass storage 630 includes, for example, one or more of a solid state drive, hard disk drive, a magnetic disk drive, an optical disk drive, or the like.

The video adapter 640 and the I/O interface 660 provide interfaces to couple external input and output devices to the apparatus 600. For example, the apparatus 600 may provide SQL command interface to clients. As illustrated, examples of input and output devices include a display 690 coupled to the video adapter 640 and any combination of mouse/keyboard/printer 670 coupled to the I/O interface 660. Other devices may be coupled to the apparatus 600, and additional or fewer interface cards may be utilized. For example, a serial interface card (not shown) may be used to provide a serial interface for a printer.

The apparatus 600 also includes one or more network interfaces 650, which includes wired links, such as an Ethernet cable or the like, and/or wireless links to access nodes or one or more networks 680. The network interface 650 allows the apparatus 600 to communicate with remote units via the networks 680. For example, the network interface 650 may provide communication to database. In an embodiment, the apparatus 600 is coupled to a local-area network or a wide-area network for data processing and communications with remote devices, such as other processing units, the Internet, remote storage facilities, or the like.

Reconstructed video signal filtering process can be integrated into the RDO process and performing on a CU-based basis, such approach is called Post-reconstruction filtering. Hadamard Transform Domain Filter (HTDF) is an example of the post reconstruction filtering. In HTDF process a subject CU is firstly divided onto a set of overlapped blocks 2×2 luma samples, then 1D Hadamard transform is performed for each block, and then for each frequency coefficient $R_i$, starting from $1^{st}$ ($0^{th}$ coefficient is bypassed) HTDF performs filtering according to the equation below.

$$F_i = G_i \times R_i = \frac{R_i^2}{R_i^2 + \sigma^2} \times R_i$$

Where σ is a quantization noise estimation. The value of quantization noise in a coded image tends to be roughly proportional to the quantization step size which is normally defined by exponential equation based on codec quantization parameter (QP).

In order to make filtering process simpler for hardware, the filtering formula can be implemented by look-up table (LUT) in the following way:

$$fHadFilt[i] = \begin{cases} fHad[i]; \text{Abs}(fHad[i]) >= aTHR \\ bLUT[(fHad[i] + (1 << (tblShift - 1))) >> tblShift]; fHad[i] > 0 \\ -bLUT[(-(fHad[i] + (1 << (tblShift - 1))) >> tblShift]; fHad[i] <= 0 \end{cases}$$

where i=1 . . . 3, aTHR, tblShift and look-up-table array bLUT are derived based on luma quantization parameter QpY in the following way.

The original efficient LUT implementation of HTDF post-reconstruction filter supposed to have predefines set of LUTs optimized for 10 bits internal video signal representation, which means that bit depth of the samples of the luma array within encoding and/or decoding processes is 10 bits regardless of original input video signal bitdepth. In the modern video compression standards such as VVC and EVC internal luma bit depth signaled at the sequence level e.g. in bit_depth_luma_minus8 syntax element and decoder typically operates with $BitDepth_Y$ variable defined as $BitDepth_Y$=8+bit_depth_luma_minus8

A straightforward extension of HTDF to support various bit depths of the video signal would imply simultaneous presence of several different filtering LUTs each of those explicitly designed and optimized for a specific bit depth. Such solution is not efficient because it required additional storage for another two LUTs and additional logic to select actual LUT to be used in the current decoding process.

Here, the value of "bit_depth_luma_minus8" corresponds to the first luma bit depth value, and the value of $BitDepth_Y$ corresponds to the second bit depth value as defined in the method according to the first aspect and its implementations forms. The "obtained first luma bit depth value" is different from the "second luma bit depth value". "BitDepthY", i.e. the second luma bit depth value is the real bit depth.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

Figure 7:
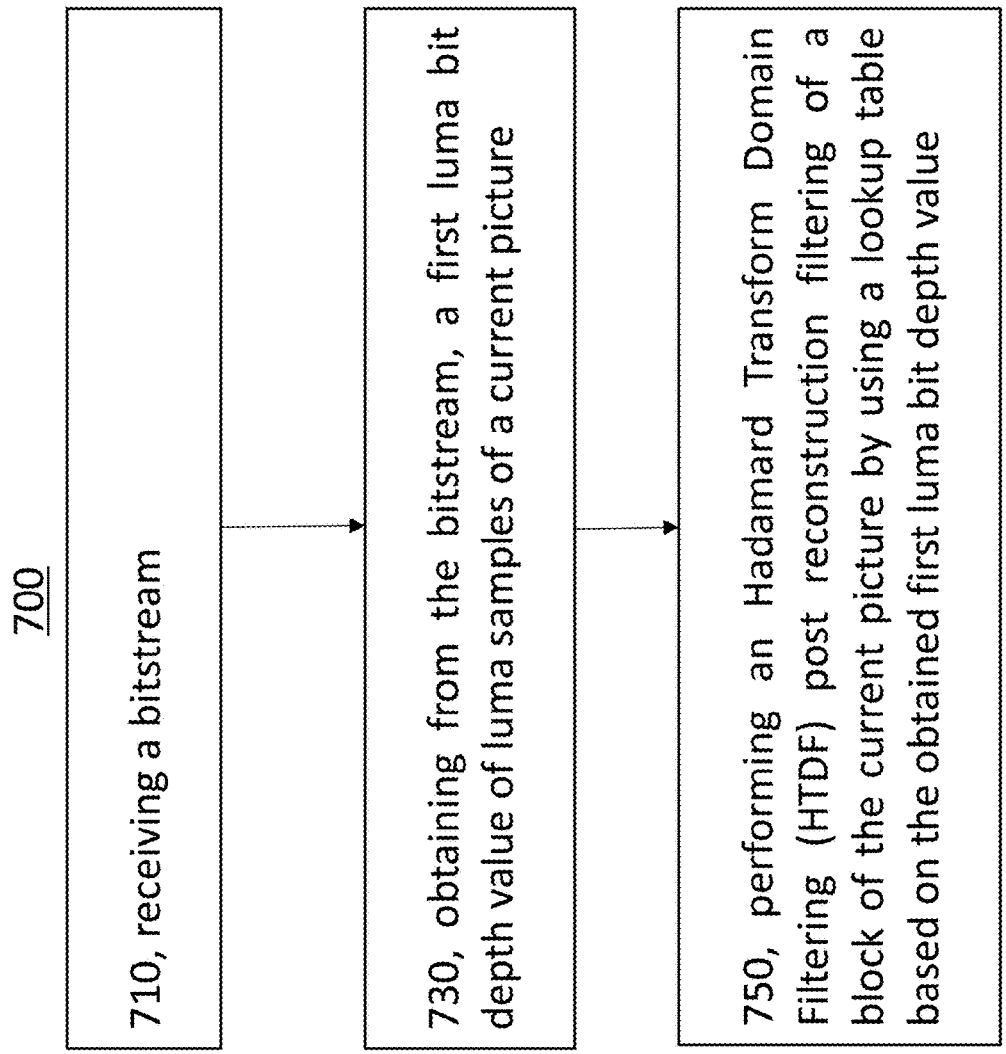
FIG. 7 is a flow diagram illustrating a decoding method, according to an embodiment of the present disclosure.
Figure 9:
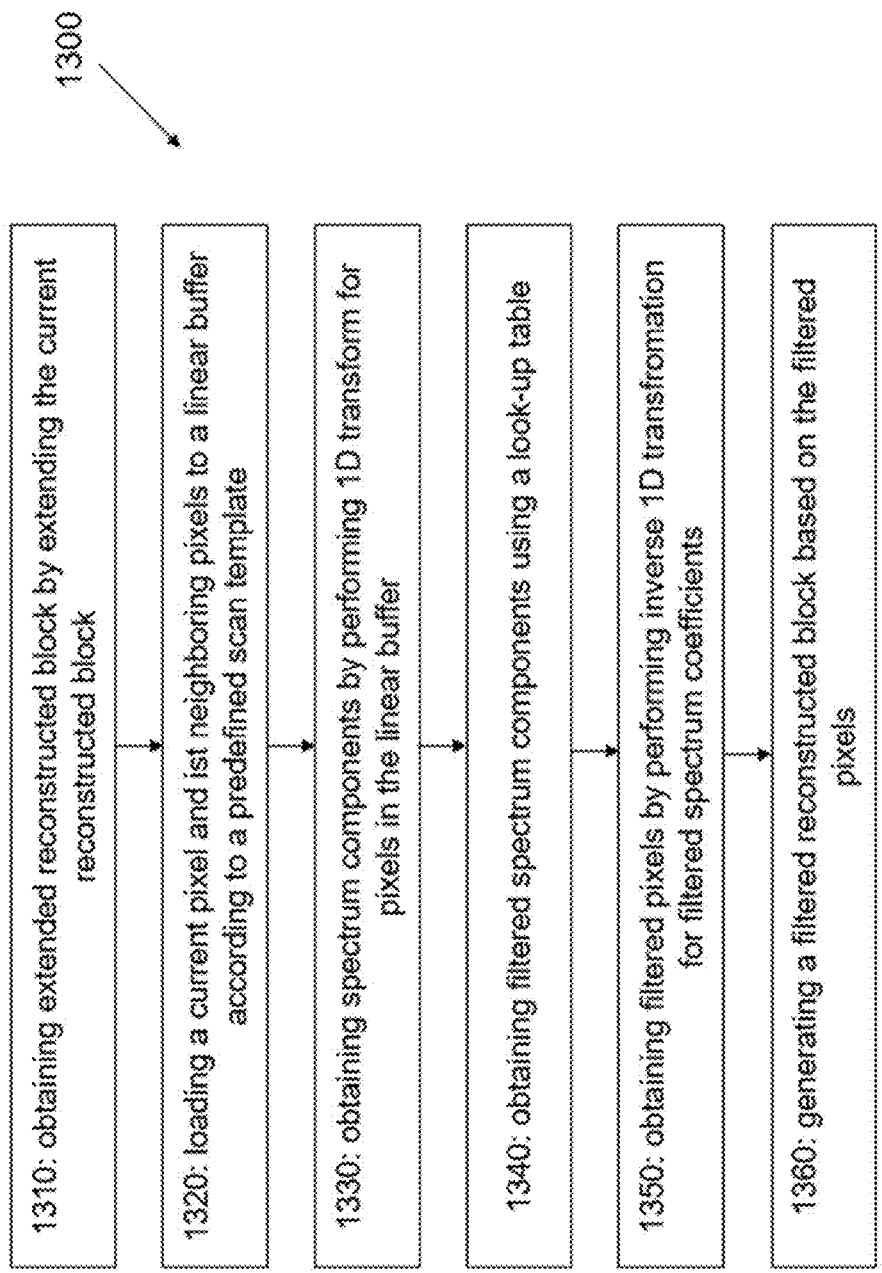
FIG. 9 is a flow diagram illustrating a method, according to an embodiment of the present disclosure.

FIG. 7 shows a flow diagram illustrating steps of a decoding method 700 according to an embodiment. The reconstructed block comprises a plurality of pixels (samples). The method 700 comprises the following steps: receiving 710 a bitstream; obtaining 730 from the bitsream, a bit depth value of luma samples of a current picture; and performing 750 an Hadamard Transform Domain Filtering (HTDF) post reconstruction filtering of a block of the current picture by using a lookup table(s) based on the obtained luma bit depth value, or performing 750 an Hadamard Transform Domain Filtering (HTDF) post reconstruction filtering of a block of the current picture based on a formula which is associated with the luma bit depth value. The step 750 may be introduced in details as shown in FIG. 9.

The method 700 can be performed by the decoding apparatus as shown in FIG. 2 or 11. Detailed information 300, 300' of FIG. 3A or 3B may be also applied to method 700 as shown in FIG. 7.

FIG. 8 shows a flow diagram illustrating steps of an encoding method 800 according to an embodiment. The reconstructed block comprises a plurality of pixels (samples). The method 800 comprises the following steps: determining 810 a bit depth value of luma samples of a current picture; performing 830 an Hadamard Transform Domain Filtering (HTDF) post reconstruction filtering of a block of the current picture by using a lookup table(s) based on the obtained luma bit depth value, or performing 830 an Hadamard Transform Domain Filtering (HTDF) post reconstruction filtering of a block of the current picture based on a formula which is associated with the luma bit depth value. The step 830 may be introduced in details as shown in FIG. 9.

The method 800 can be performed by the encoding apparatus as shown in FIG. 1 or 10. Detailed information 300, 300' of FIG. 3A or 3B may be also applied to method 800 as shown in FIG. 8.

When use for the encoding, the bit depth value of luma samples of a current picture is obtained from an encoder configuration file which is specified based on a use case and determined by the user.

FIG. 9 shows a flow diagram illustrating steps of a corresponding (in-loop or post) filtering method 1300 according to an embodiment. The reconstructed block comprises a plurality of pixels (samples). The method 1300 comprises the following steps:

obtaining 1310 an extended reconstructed block by extending the current reconstructed block to include one or more padding samples obtained based on at least one sample from the current reconstructed block; loading 1320 a current pixel of the extended reconstructed block (or the current reconstructed block) and its neighboring pixels of the current pixel to a linear buffer according to a predefined scan template; obtaining 1330 Hadamard spectrum components (fHad) by performing Hadamard transform for pixels in the linear buffer; obtaining 1340 filtered Hadamard spectrum components (fHadFilt) based on the obtained Hadamard spectrum components by using the lookup table(s) based on the obtained luma bit depth value, wherein an input of the lookup table(s) is normalized to a first bit depth representation (e.g. 10 bits representation), and an output of the lookup table(s) is normalized to the luma bit depth value, to obtain the filtered Hadamard spectrum components (fHadFilt), or alternatively, obtaining 1340 filtered Hadamard spectrum components (fHadFilt) by using one or more lookup tables according to a formula which is associated with the bit depth value; obtaining 1350 filtered pixels by performing inverse Hadamard transform for the filtered Hadamard spectrum components; and generating 1360 a filtered reconstructed block based on the filtered pixels. It is noted that step 1310 is an optional step.

The disclosure describes an in-loop filter for lossy video codec which performs filtering of a reconstructed block from a reconstructed frame. According to an example, the reconstructed frame is divided into a set of rectangular macro-blocks (CU blocks). In the next step, each reconstructed macro-block (reconstructed CU block) is filtered in a frequency domain independently from other reconstructed macro-blocks, in particular independently from the filtering of the other reconstructed macro-blocks. The filter can also be applied after transform and reconstruction, and the filtered result is used both for output as well as for spatial and temporal prediction. The filtering process operates with input video signal with various bit depth in an integer range from 8 to 16 bits inclusively.

The method 1300 can be performed by the encoding apparatus as shown in FIG. 1 or 10 and the decoding apparatus as shown in FIG. 2 or 11. Detailed information 300, 300' of FIG. 3A or 3B may be also applied to method 1300 as shown in FIG. 9.

In an example, the filtering method can be used in image encoding or image decoding. When use for the encoding, the bit depth value of luma samples of a current picture is obtained from an encoder configuration file which is specified based on a use case and determined by the user.

The present disclosure allows to support various bit depth video signal by HTDF post reconstruction filter by modifying filtering formula without changes in the given LUTs. In the prior art the following filtering formula is used as a filtering step of HTDF for i=1 . . . 2:

$$fHadFilt[i] = \begin{cases} fHad[i]; \text{Abs}(fHad[i]) >= aTHR \\ bLUT[(fHad[i] + (1 << (tblShift - 1))) >> tblShift]; fHad[i] > 0, \text{Abs}(fHad[i]) < aTHR \\ -bLUT[((-fHad[i]) + (1 << (tblShift - 1))) >> tblShift]; fHad[i] <= 0, \text{Abs}(fHad[i]) < aTHR, (*) \end{cases}$$

$$fHadFilt[i] = \begin{cases} fHad[i]; \text{Abs}(fHad[i]) >= aTHR \\ bLUT[(fHad[i] + (1 << (tblShift - 1))) >> tblShift]; fHad[i] > 0, (*) \\ -bLUT[(-(fHad[i]) + (1 << (tblShift - 1))) >> tblShift]; fHad[i] <= 0, \end{cases}$$

where bLUT is a look up table predefined for 10 bit internal video representation.

1.2.2 The First Embodiment of the Present Disclosure

In the first embodiment of the present disclosure, the HTDF filtering formula (*) is modified to allow scaling of the input value (fHad[i]) and further clearly specify cases of each filtering option usage in the following way:

The formula () can be alternatively rewritten in the following way equivalently to the formula ():

$$fHadFilt[i] = \begin{cases} fHad[i]; \text{Abs}(fHad[i]) >= aTHR \\ \text{Sign}(fHad[i]) \times bLUT[(\text{Abs}(fHad[i]) + (1 << (tblShift - 1))) >> tblShift]; \text{Abs}(fHad[i]) **) \end{cases}$$

1.2.2 The Second Embodiment of the Present Disclosure

In the first embodiment of the present disclosure, 8 bits video signal representation support is added to the current design of HTDF filtering process. It is proposed to use a modified formula (**) as given below, if the bit depth is set to 8 bit.

$$fHadFilt[i] = \begin{cases} fHad[i]; \text{Abs}(fHad[i]) << 2 >= aTHR \\ bLUT[(fHad[i] << 2 + (1 << (tblShift - 1))) >> tblShift] >> 2; fHad[i] > 0, \text{Abs}(fHad[i]) \\ -(bLUT[((-fHad[i]) << 2 + (1 << (tblShift - 1))) >> tblShift] >> 2); fHad[i] <= 0, \text{Abs}(fHad[i]) \end{cases}$$

1.2.3 The Third Embodiment of the Present Disclosure

In the third embodiment of the present disclosure 12 bits video signal representation support is added to the current design of HTDF filtering process. It is proposed to use a modified formula (**) as given below, if the bit depth is set to 12 bit.

$$fHadFilt[i] = \begin{cases} fHad[i]; \text{Abs}(fHad[i]) >> 2 >= aTHR \\ bLUT[(fHad[i] >> 2 + (1 << (tblShift - 1))) >> tblShift] << 2; fHad[i] > 0, \text{Abs}(fHad[i]) \\ -(bLUT[((-fHad[i]) >> 2 + (1 << (tblShift - 1))) >> tblShift] << 2); fHad[i] <= 0, \text{Abs}(fHad[i]) \end{cases}$$

1.2.4 The Fourth Embodiment of the Present Disclosure

In the fourth of the present disclosure a general extension of formula (**) is proposed in order to support variable internal bit depth in the integer the range of [8, 16] bits.

Let $bitDepth_y$ is a variable represent internal bitdepth of luma component of the video signal internal representation, which can be any integer number from 8 to 16 inclusively.

Then filtering formula (**) can be modified in order to support variable bit depths in the following way.

If $bitDepth < 10$ $bdShift = 10 - bitDepth_y$ $fHadFilt[i] =$ $$\begin{cases} fHad[i]; \text{Abs}(fHad[i]) << bdShift >= aTHR \\ bLUT\big[\big(fHad[i] << bdShift + (1 << (tblShift-1))\big) >> tblShift\big] >> bdShift; fHad[i] > 0, \text{Abs}(fHad[i]) << bdShift < aTHR \\ -\big(bLUT\big[\big((-fHad[i]) << bdShift + (1 << (tblShift-1))\big) >> tblShift\big] >> bdShift\big); fHad[i] <= 0, \text{Abs}(fHad[i]) << bdShift < aTHR \end{cases}$$

otherwise $bdShift = bitDepth_y - 10$ $fHadFilt[i] =$ $$\begin{cases} fHad[i]; \text{Abs}(fHad[i]) >> bdShift >= aTHR \\ bLUT\big[\big(fHad[i] >> bdShift + (1 << (tblShift-1))\big) >> tblShift\big] << bdShift; fHad[i] > 0, \text{Abs}(fHad[i]) >> bdShift < aTHR \\ -\big(bLUT\big[\big((-fHad[i]) >> bdShift + (1 << (tblShift-1))\big) >> tblShift\big] << bdShift\big); fHad[i] <= 0, \text{Abs}(fHad[i]) >> bdShift < aTHR \end{cases}$$

Here, if second luma bit depth value less than 10, the filtering is performed in that the LUT contains a left shift process by (10-second luma bit depth value) bits; and otherwise the filtering is performed in that the LUT contains a right shift process by (second luma bit depth value-10) bits. $BitDepth_Y$ corresponds to the second bit depth value and is the real luma bit depth value.

1.3 The Beneficial Effects and Advantages of Embodiments of the Disclosure

The four abovementioned embodiments allow utilize HTDF beneficial effect for a wide range or different bit depths without storing any additional LUTs designed for each supported bit depth value.

The example of post-reconstruction filter process is as follows.

Inputs to this process are:
a location (xCb, yCb) specifying the top-left sample of the current luma block relative to the top-left sample of the current picture,
two variables nCbW and nCbH specifying the width and the height of the current luma coding block, and
a luma quantization parameter $Qp_Y$ of the current block.

The output of this process is the modified reconstructed picture sample array $S_L$.

The process is not applied if one of the following conditions is true:

- nCbW * nCbH < 64.
- Max( nCbW, nCbH ) >= 128.
- Min( nCbW, nCbH ) >= 32 & & LumaPredMode[ xCb ][ yCb ] != MODE_INTRA.
- $Qp_Y$ <= 17.

An (nCbW+2)×(nCbH+2) array of padded reconstructed luma samples recSamplesPad, with location (xCb, yCb) specifying the top-left sample of the current luma block, size (nCbW, nCbH) of the current block and array $S_L$ specifying the reconstructed picture sample array as inputs.

The accumulated filtered samples accFlt[x][y] are initialized to be equal to zero and then derived based on padded reconstructed luma samples recSamplesPad, with x=−1 . . . nCbW−1, y=−1 . . . nCbH−1 as follows:

The input array for filtering inFilt including a current pixel and three its neighbouring pixels according to the scan template scanTmpl with i=0 . . . 3 is derived as follows:

inFilt[ i ] = 
recSamplesPad[ x + scanTmpl[ i ][ 1 ] ][ y + scanTmpl[ i ][ 0 ] ]
, where array scanTmpl is equal to { ( 0, 0 ), ( 0, 1 ), ( 1, 0 ), ( 1, 1 ) }

The Hadamard spectrum components fHad are derived by performing Hadamard transform as follows:

fHad[ 0 ] = inFilt[ 0 ] + inFilt[ 2 ] + inFilt[ 1 ] + inFilt[ 3 ]
fHad[ 1 ] = inFilt[ 0 ] + inFilt[ 2 ] − inFilt[ 1 ] − inFilt[ 3 ]
fHad[ 2 ] = inFilt[ 0 ] − inFilt[ 2 ] + inFilt[ 1 ] − inFilt[ 3 ]
fHad[ 3 ] = inFilt[ 0 ] − inFilt[ 2 ] − inFilt[ 1 ] + inFilt[ 3 ]

The filtered Hadamard spectrum components fHadFilt are derived using look-up table as follows with i=1 . . . 3, where variables aTHR, tblShift and look-up-table array bLUT are derived based on luma quantization parameter $Qp_Y$:

If $bitDepth < 10$ $bdShift = 10 - bitDepth$ $fHadFilt[i] =$ $$\begin{cases} fHad[i]; \text{Abs}(fHad[i]) << bdShift >= aTHR \\ bLUT\big[(fHad[i] << bdShift + (1 << (tblShift - 1))) >> tblShift\big] >> bdShift; fHad[i] > 0, \text{Abs}(fHad[i]) << bdShift < aTHR \\ -\big(bLUT\big[((-fHad[i]) << bdShift + (1 << (tblShift - 1))) >> tblShift\big] >> bdShift\big); fHad[i] <= 0, \text{Abs}(fHad[i]) << bdShift < aTHR \end{cases}$$

otherwise $bdShift = bitDepth - 10$ $fHadFilt[i] =$ $$\begin{cases} fHad[i]; \text{Abs}(fHad[i]) >> bdShift >= aTHR \\ bLUT\big[(fHad[i] >> bdShift + (1 << (tblShift - 1))) >> tblShift\big] << bdShift; fHad[i] > 0, \text{Abs}(fHad[i]) >> bdShift < aTHR \\ -\big(bLUT\big[((-fHad[i]) >> bdShift + (1 << (tblShift - 1))) >> tblShift\big] << bdShift\big); fHad[i] <= 0, \text{Abs}(fHad[i]) >> bdShift < aTHR \end{cases}$$

$fHadFilt[0] = fHad[0]$

The filtered pixels invHadFilt are derived by performing inverse Hadamard transform for filtered spectrum components fHadFilt as follows:

```
invHadFilt[ 0 ] = fHadFilt[ 0 ] + fHadFilt[ 2 ] + fHadFilt[ 1 ] + fHadFilt[ 3 ]
invHadFilt[ 1 ] = fHadFilt[ 0 ] + fHadFilt[ 2 ] − fHadFilt[ 1 ] − fHadFilt[ 3 ]
invHadFilt[ 2 ] = fHadFilt[ 0 ] − fHadFilt[ 2 ] + fHadFilt[ 1 ] − fHadFilt[ 3 ]
invHadFilt[ 3 ] = fHadFilt[ 0 ] − fHadFilt[ 2 ] − fHadFilt[ 1 ] + fHadFilt[ 3 ]
```

The filtered pixels invHadFilt are accumulated in accumulation buffer accFlt according to the scan template scanTmpl with i=0 . . . 3 as follows:

accFlt[x+scanTmpl[$i$][$l$]][y+scanTmpl[$i$][0]]+=invHadFilt[$i$]>>2

The reconstructed picture sample array $S_L$ is modified as follows for x=0 . . . nCbW−1 and y=0 . . . nCbH−1:

$S_L[xCb+x][yCb+y]=\text{Clip1}_Y((\text{accFlt}[x][y]+2)>>2)$

Below is an exemplary logic of a derivation process for post-reconstruction filter look-up table specified as follows.

Input to this process is a luma quantization parameter $Qp_Y$ of the current block.

Outputs of this process are:
a look-up-table bLUT used for filtering of the block,
a look-up-table access threshold aTHR,
a look-up-table index shift tblShift.

The look-up-table and corresponding parameters used for filtering of the block are selected from the set of the look-up-tables based on luma quantization parameter $Qp_Y$.

The index of look-up-table in the set qpIdx is derived as follows:

```
if( LumaPredMode[ xCb ][ yCb ] = =
MODE_INTER && nCbW = = nCbH &&
Min( nCbW, nCbH ) >= 32)
    qpIdx = Clip3( 0, 4, ( Qp_Y − 28 + ( 1 << 2 ) ) >> 3 )
else
    qpIdx = Clip3( 0, 4, ( Qp_Y − 20 + ( 1 << 2 ) ) >> 3 )
```

The look-up-table bLUT used for filtering of the block is derived by selecting array from setOfLUT based on qpIdx:

```
bLUT = setOfLUT[ qpIdx ]
setOfLUT[ 5 ][ 16 ] =
{
    { 0, 0, 2, 6, 10, 14, 19, 23, 28, 32, 36, 41, 45, 49, 53, 57, },
    { 0, 0, 5, 12, 20, 29, 38, 47, 56, 65, 73, 82, 90, 98, 107, 115, },
    { 0, 0, 1, 4, 9, 16, 24, 32, 41, 50, 59, 68, 77, 86, 94, 103, },
    { 0, 0, 3, 9, 19, 32, 47, 64, 81, 99, 117, 135, 154, 179, 205, 230, },
    { 0, 0, 0, 2, 6, 11, 18, 27, 38, 51, 64, 96, 128, 160, 192, 224, },
}
```

The variable tblShift is derived as follows:

```
tblShift = tblThrLog2[ qpIdx ] − 4
tblThrLog2[ 5 ] = { 6, 7, 7, 8, 8 }
```

The look-up-table access threshold aTHR is derived as follows:

aTHR=(1<<tblThrLog2[qpIdx])−(1<<tblShift)

It is noted that the present disclosure is not limited to the detailed exemplary implementation described above. In particular, the exemplary variables and conditions serve only as a detailed example. For example, the checking may be based on other additional or alternative conditions. For example, the checking may be based on other additional or alternative variables and parameters. Moreover, the present disclosure may implement derivation of availability in any manner which may be adapted to some particular parameters of the codec.

For example, it is determined whether a corresponding neighboring block is available for a current block based on the blocks coding order. In another example, a corresponding neighboring block is available for a current block in the case that the current and neighboring blocks belonging to same slice, tile, tile group. In another example, a corresponding neighboring block is not available for a current block in the case that the location of neighboring block beyond picture boundary.

The block coding order may be regarded as block encoding and/or block decoding order which may be regarded as block reconstruction order, since both encoding and decoding apply reconstruction to blocks. As mentioned above, the block reconstruction order corresponds to block scanning order, i.e. to the order in which the blocks of a picture are scanned for processing (encoding, decoding, reconstruction).

In some implementation of the present disclosure, neighboring samples availability checking for padding process may be different for filtering of inter and intra blocks. For inter blocks it may further check whether available samples belong to intra or inter predicted blocks. If samples belong to inter predicted blocks, it can be used for padding, otherwise it cannot be used for padding. It may be beneficial for some hardware implementation when intra and inter blocks are reconstructed in different pipelines with using of different operating memory. Using neighboring samples coming only from inter blocks during inter blocks post-reconstruction filtering allows to avoid dependency between different pipelines, that simplifies logic and speedups overall processing pipeline.

Following is an explanation of the applications of the encoding method as well as the decoding method as shown in the above-mentioned embodiments, and a system using them.

Figure 12:
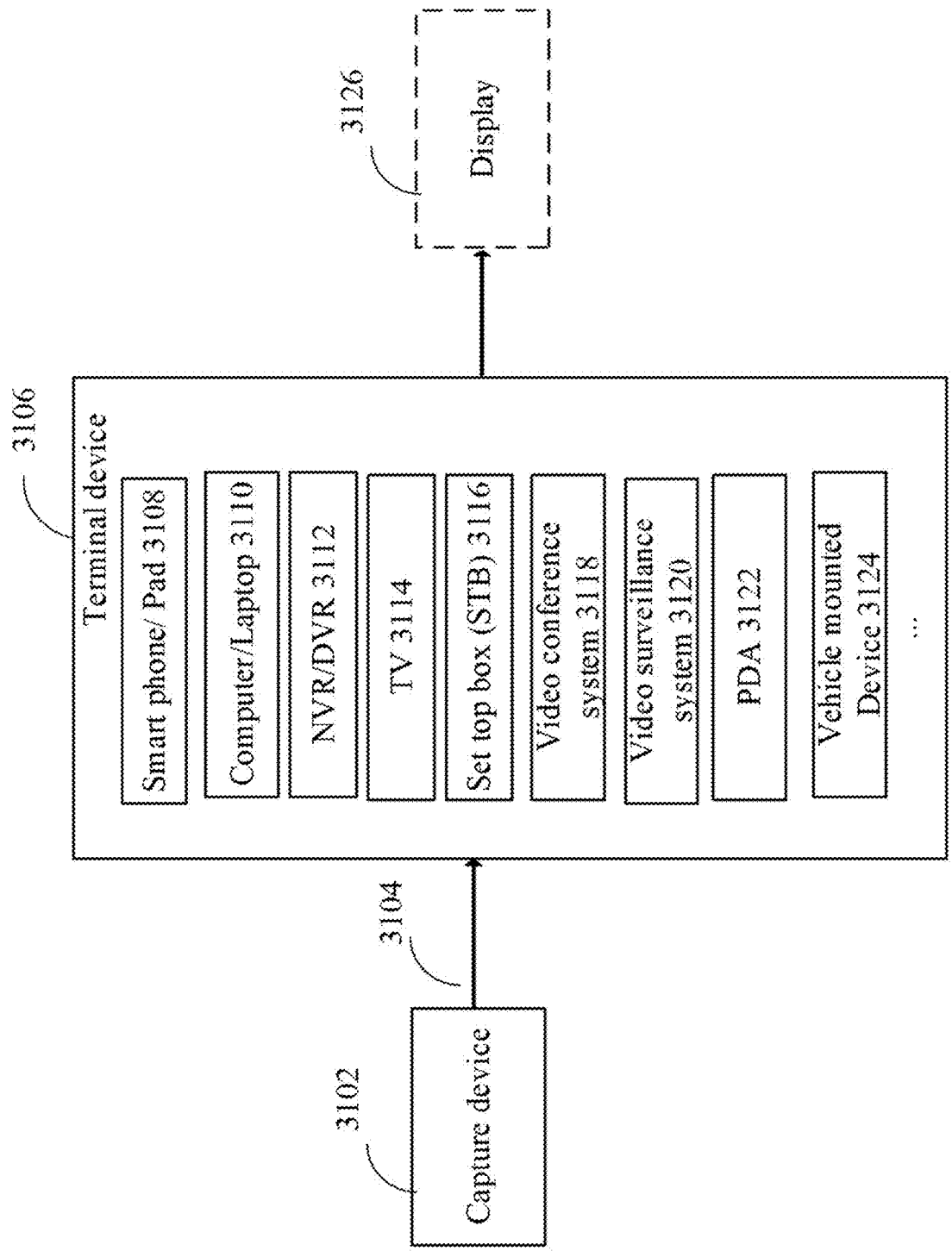
FIG. 12 is a block diagram showing an example structure of a content supply system 3100 which realizes a content delivery service, according to an embodiment of the present disclosure.

FIG. 12 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/ digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 13:
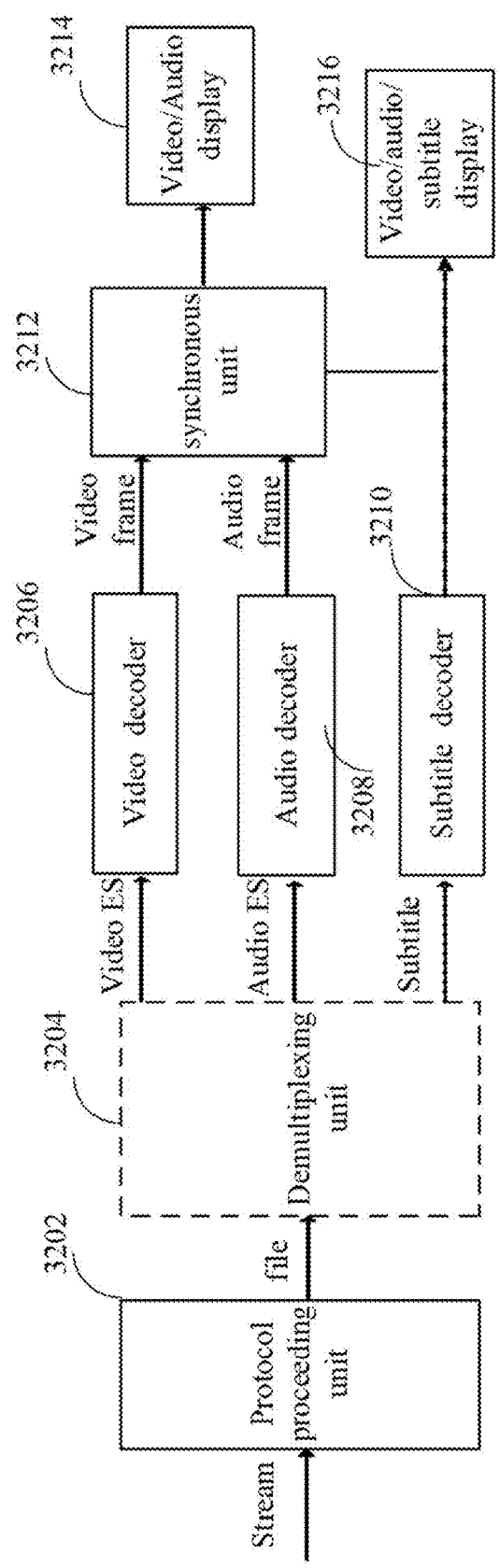
FIG. 13 is a block diagram showing a structure of an example of a terminal device, according to an embodiment of the present disclosure.

FIG. 13 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 15) before feeding it to the synchronous unit 3212. Similarly, the audio frame may store in a buffer (not shown in FIG. 15) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

FIG. 14 shows a decoder 1400, comprising one or more processors 1401 and a non-transitory computer-readable storage medium 1402 coupled to the processors 1401 and storing programming for execution by the processors 1401, wherein the programming, when executed by the processors 1401, configures the decoder to carry out the method according to the first aspect or any one of the implementation forms thereof.

FIG. 15 is a block diagram of a decoder according to another embodiment. The decoder 1500 comprises receiving means 1501 for receiving a bitstream; obtaining means 1502 for obtaining from the bitstream, a first luma bit depth value of luma samples of a current picture; and filtering means 1503 for performing an Hadamard Transform Domain Filtering post reconstruction filtering of a block of the current picture by using a lookup table based on the obtained first luma bit depth value.

The present disclosure provides the following further examples:

According to a first example the disclosure relates to a method of coding implemented by a decoding device, comprising:
  receiving a bitstream;
  obtaining from the bitstream, a bit depth value of luma samples of a current picture (e.g. a luma bit depth value);
  performing an Hadamard Transform Domain Filtering (HTDF) post reconstruction filtering of a block of the current picture by using a lookup table(s) based on the obtained luma bit depth value.

From above, it allow utilize HTDF beneficial effect for a wide range or different bit depths without storing any additional LUTs designed for each supported bit depth value.

In a possible implementation form, the lookup table(s) are predefined or designed for a first bit depth representation.

In a possible implementation form, the first bit depth representation is 10 bits bit depth representation.

In a possible implementation form, the lookup table(s) is used for a plurality of luma bit depth values.

In a possible implementation form, the lookup table(s) is used for 10 bits bit depth, 8 bits bit depth, 12 bits bit depth and/or other bit depth value.

In a possible implementation form, the performing an Hadamard Transform Domain Filtering (HTDF) post reconstruction filtering of a block of the current picture by using the lookup table(s) based on the obtained luma bit depth value, comprises:
  when the luma bit depth value is not the first bit depth representation, performing an Hadamard Transform Domain Filtering (HTDF) post reconstruction filtering of a block of the current picture by using the lookup table(s), wherein an input of the lookup table(s) is normalized to a first bit depth representation, and an output of the lookup table(s) is normalized to the obtained luma bit depth value; and/or
  when the luma bit depth value is the first bit depth representation, performing an Hadamard Transform Domain Filtering (HTDF) post reconstruction filtering of a block of the current picture by using the lookup table(s), wherein an input of the lookup table(s) is the first bit depth representation, and no normalization is required for an output of the lookup table(s).

It can be understood that, even if the bit depth value is different from the first bit depth representation (such as 10 bits bit depth), an input (e.g. LUT element index) of the lookup table(s) is normalized to the first bit depth representation (such as 10 bits bit depth) and an output (e.g. the filtered Hadamard spectrum components) of the lookup table(s) is normalized to the obtained internal bit depth value (such as 8 bits bit depth or 12 bits bit depth).

From above, it allow utilize HTDF beneficial effect for a wide range or different bit depths without storing any additional LUTs designed for each supported bit depth value.

In a possible implementation form, the step of performing an HTDF post reconstruction filtering of a block of the current picture, comprises:
  when at least one condition is satisfied, performing an HTDF post reconstruction filtering of a block of the current picture using one or more predefined HTDF lookup tables based on the formula which is associated with the luma bit depth value; or
  when at least one condition is satisfied, performing an Hadamard Transform Domain Filtering (HTDF) post reconstruction filtering of a block of the current picture by using lookup table(s) based on the obtained luma bit depth value.

In a possible implementation form, the condition is based on a comparison result between a scaled Hadamard spectrum component and a predefined threshold value;
or
when the condition is satisfied, comprises: when a scaled Hadamard spectrum component is less than a predefined threshold value.

In a possible implementation form, the step of performing an HTDF post reconstruction filtering of a block of the current picture, comprises:
  loading a current pixel of a reconstructed block or an extended reconstructed block and its neighboring pixels of the current pixel according to a predefined scan template;
  obtaining Hadamard spectrum components (fHad) by performing a Hadamard transform for the pixels;
  obtaining filtered Hadamard spectrum components (fHadFilt) based on the obtained Hadamard spectrum components by using the lookup table(s) based on the obtained luma bit depth value, wherein an input of the lookup table(s) is normalized to a first bit depth representation (e.g. 10 bits representation), and an output of the lookup table(s) is normalized to the luma bit depth value, to obtain the filtered Hadamard spectrum components (fHadFilt); obtaining filtered pixels by performing an inverse Hadamard transform transform for the filtered Hadamard spectrum components; and
  generating a filtered reconstructed block based on the filtered pixels.

In a possible implementation form, the step of obtain filtered Hadamard spectrum components, comprises:
  performing a conditional check of scaled Hadamard spectrum components and a predefined threshold value, wherein the scaling process of an absolute value of the Hadamard spectrum component is performed based on the luma bit depth value;

when said condition is satisfied, deriving output filtered Hadamard spectrum components by using the predefined lookup table(s) based on a LUT element index, wherein the LUT element index is derived based on the scaled Hadamard spectrum components (e.g. fHad[i]<<2 or (−fHad[i])<<2); and performing a scaling of the output filtered Hadamard spectrum components to obtain the filtered Hadamard spectrum components, wherein the scaling process of the output filtered Hadamard spectrum components is performed based on the luma bit depth value.

In a possible implementation form, the lookup table(s) is obtained based on a quantization parameter (Qp) of the block.

According to another example the disclosure relates to a method of coding implemented by a decoding device. The method includes: receiving a bitstream;

obtaining from the bitsream, a bit depth value (e.g. a luma bit depth value) of luma samples of a current picture (or sequence) (or deriving a bit depth value of luma samples of a current picture from the bitsream); and performing an Hadamard Transform Domain Filtering (HTDF) post reconstruction filtering of a block (eg. a reconstructed block) of the current picture (or a current sequence) based on a respective formula which is associated with the luma bit depth value (e.g. by using predefined lookup table(s)).

In an exemplary implementation, the performing an HTDF post reconstruction filtering may include performing an HTDF post reconstruction filtering of the block by predefined lookup table(s) usage based on the bit depth value which corresponds to a respective formula (such as, among respective formulas).

In an exemplary implementation, there may be a plurality of formulas which correspond to different luma bit depth values.

In an exemplary implementation, the (predefined) one or more lookup table(s) are designed for 10 bits internal bit depth representation, however the one or more lookup tables (e.g. a same LUT or a same set of LUTs) may be used for a plurality of luma bit depth values, such as, not only 10 bits internal bit depth, but also 8 bits internal bit depth and/or 12 bits internal bit depth and other bit depth value.

It can be understood that, even if the bit depth value is different from 10 bits bit depth, by using the respective formula which is associated with the luma bit depth value, an input (e.g. LUT element index) of the lookup table(s) is normalized to 10 bits representation and an output (e.g. the filtered Hadamard spectrum components) of the lookup table(s) is normalized to the obtained internal bit depth value.

From above, it allow utilize HTDF beneficial effect for a wide range or different bit depths without storing any additional LUTs designed for each supported bit depth value.

In an exemplary implementation, wherein the step of performing an HTDF post reconstruction filtering of a block of the current picture, comprises:

loading a current pixel of a reconstructed block and its neighboring pixels of the current pixel according to a predefined scan template;

obtaining Hadamard spectrum components (fHad) by performing a Hadamard transform for the pixels;

obtaining filtered Hadamard spectrum components (fHadFilt) based on the obtained Hadamard spectrum components by using the lookup table(s) according to the formula which is associated with the luma bit depth value; or obtaining filtered Hadamard spectrum components (fHadFilt) based on the obtained Hadamard spectrum components by using the lookup table(s), wherein an input (e.g. LUT element index) of the lookup table(s) is normalized to a first bit depth representation (e.g. 10 bits representation), and an output (e.g. output filtered Hadamard spectrum components) of the lookup table(s) is normalized to the obtained luma bit depth value, to obtain the filtered Hadamard spectrum components (fHadFilt);

obtaining filtered pixels by performing an inverse Hadamard transform transform for the filtered Hadamard spectrum components; and generating a filtered reconstructed block based on the filtered pixels.

In an exemplary implementation, the luma bit depth signaled at the sequence level e.g. in bit_depth_luma_minus8 syntax element and decoder typically operates with $BitDepth_Y$ variable defined as $BitDepth_Y$=8+bit_depth_luma_minus8. Some embodiments of the present disclosure are not limited to such exemplary implementation.

In an exemplary implementation, the lookup table is obtained based on a quantization parameter (Qp) of the current reconstructed block. This facilitates efficient implementation without necessity for complex calculations.

According to a second example the disclosure relates to a method of coding implemented by an encoding device. The method includes:

determining a bit depth value of luma samples of a current picture (e.g. a luma bit depth value);

performing an Hadamard Transform Domain Filtering (HTDF) post reconstruction filtering of a block of the current picture by using a lookup table(s) based on the obtained luma bit depth value, or performing an Hadamard Transform Domain Filtering (HTDF) post reconstruction filtering of a block of the current picture based on a formula which is associated with the luma bit depth value.

It allow utilize HTDF beneficial effect for a wide range or different bit depths without storing any additional LUTs designed for each supported bit depth value.

In an exemplary implementation, the luma bit depth value is obtained from an encoder configuration file.

Further features and implementation forms of the method according to the second example of the disclosure correspond to the features and implementation forms of the method according to the first example of the disclosure.

According to a third example the disclosure relates to a decoding apparatus. The apparatus comprises:

an entropy decoding unit 1104, configured for receiving a bitsream; and obtaining from the bitsream, a bit depth value of luma samples of a current picture;

a post reconstruction filter 1118, configured for performing an Hadamard Transform Domain Filtering (HTDF) post reconstruction filtering of a block of the current picture by using a lookup table(s) based on the obtained luma bit depth value, or performing an Hadamard Transform Domain Filtering (HTDF) post reconstruction filtering of a block (i.e. reconstructed block) of the current picture based on a formula which is associated with the luma bit depth value;

The apparatus according to the third example can be extended into implementation forms corresponding to the implementation forms of the method according to the first example. Hence, an implementation form of the apparatus comprises the feature(s) of the corresponding implementation form of the method according to the first example.

The advantages of the apparatus according to the third example are the same as those for the corresponding implementation forms of the method according to the first example. According to a fourth example the disclosure relates to an encoding apparatus. The apparatus comprises: . . .
- a determining unit 1017 (not shown in FIG. 10), configured for determining a bit depth value of luma samples of a current picture;
- a post reconstruction filter 1018, configured for performing an Hadamard Transform Domain Filtering (HTDF) post reconstruction filtering of a block of the current picture by using a lookup table(s) based on the obtained luma bit depth value, or performing an Hadamard Transform Domain Filtering (HTDF) post reconstruction filtering of a block of the current picture based on a formula which is associated with the luma bit depth value.

The apparatus according to the fourth example can be extended into implementation forms corresponding to the implementation forms of the method according to the second example. Hence, an implementation form of the apparatus comprises the feature(s) of the corresponding implementation form of the method according to the second example.

The advantages of the apparatus according to the fourth example are the same as those for the corresponding implementation forms of the method according to the second example.

According to a fifth example the disclosure relates to an apparatus for decoding a video stream includes a processor and a memory. The memory is storing instructions that cause the processor to perform the method according to any of the preceding examples.

According to a sixth example the disclosure relates to an apparatus for encoding a video stream includes a processor and a memory. The memory is storing instructions that cause the processor to perform the method according to any of the preceding examples.

According to a seventh example, a computer-readable storage medium having stored thereon instructions that when executed cause one or more processors configured to code video data is proposed. The instructions cause the one or more processors to perform a method according to any of the preceding examples or any possible embodiment of any of the preceding examples.

According to an eighth example, the disclosure relates to a computer program product comprising program code for performing the method according to any of the above-mentioned examples, embodiments and examples when executed on a computer.

Thus, the filter is provided allowing improving the efficiency for video coding in a wide range of applications. More specifically, the improved filter according to embodiments of the disclosure can be used for video compression that represents video signal with bit depth samples values from 8 bits per sample to 16 bits per same using the only one set or same set of look up tables.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\dfrac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators

The following logical operators are defined as follows:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Relational Operators

The following relational operators are defined as follows:

| | |
|---|---|
| > | Greater than |
| >= | Greater than or equal to |
| < | Less than |
| <= | Less than or equal to |
| == | Equal to |
| != | Not equal to |

When a relational operator is applied to a syntax element or variable that has been assigned the value "no" (not applicable), the value "na" is treated as a distinct value for the syntax element or variable. The value "na" is considered not to be equal to any other value.

Bit-Wise Operators

The following bit-wise operators are defined as follows:

| | |
|---|---|
| & | Bit-wise "and". When operating on integer arguments, operates on a two's complement representation of the integer value. When operating on a binary argument that contains fewer bits than another argument, the shorter argument is extended by adding more significant bits equal to 0. |
| \| | Bit-wise "or". When operating on integer arguments, operates on a two's complement representation of the integer value. When operating on a binary argument that contains fewer bits than another argument, the shorter argument is extended by adding more significant bits equal to 0. |

-continued

| | |
|---|---|
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. |

Bits shifted into the least significant bits (LSBs) as a result of the left shift have a value equal to 0.

Assignment Operators

The following arithmetic operators are defined as follows:

| | |
|---|---|
| = | Assignment operator |
| ++ | Increment, i.e., x++ is equivalent to x = x + 1; when used in an array index, evaluates to the value of the variable prior to the increment operation. |
| −− | Decrement, i.e., x−− is equivalent to x = x − 1; when used in an array index, evaluates to the value of the variable prior to the decrement operation. |
| += | Increment by amount specified, i.e., x += 3 is equivalent to x = x + 3, and x += (−3) is equivalent to x = x + (−3). |
| −= | Decrement by amount specified, i.e., x −= 3 is equivalent to x = x − 3, and x −= (−3) is equivalent to x = x − (−3). |

Range Notation

The following notation is used to specify a range of values:

x=y . . . z  x takes on integer values starting from y to z, inclusive, with x, y, and z being integer numbers and z being greater than y.

Mathematical Functions

The following mathematical functions are defined:

$$\text{Abs}(x) = \begin{cases} x & ; \ x >= 0 \\ -x & ; \ x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$\text{Atan2}(x, y) = \begin{cases} \text{Atan}\left(\frac{y}{x}\right) & ; \ x > 0 \\ \text{Atan}\left(\frac{y}{x}\right) + \pi & ; \ x < 0 \ \&\& \ y >= 0 \\ \text{Atan}\left(\frac{y}{x}\right) - \pi & ; \ x < 0 \ \&\& \ y < 0 \\ +\frac{\pi}{2} & ; \ x == 0 \ \&\& \ y >= 0 \\ -\frac{\pi}{2} & ; \text{otherwise} \end{cases}$$

Ceil(x) the smallest integer greater than or equal to x.

$$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x & ; \ z < x \\ y & ; \ z > y \\ z & ; \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d & ; \ b - a >= d/2 \\ c - d & ; \ a - b > d/2 \\ c & ; \text{otherwise} \end{cases}$$

Ln(x) the natural logarithm of x (the base-e logarithm, where e is the natural logarithm base constant 2.718 281 828 . . . ).

log2(x) the base-2 logarithm of x.

Log10(x) the base-10 logarithm of x.

$$\text{Min}(x, y) = \begin{cases} x & ; \ x <= y \\ y & ; \ x > y \end{cases}$$

$$\text{Max}(x, y) = \begin{cases} x & ; \ x >= y \\ y & ; \ x < y \end{cases}$$

$$\text{Round}(x) = \text{Sign}(x) * \text{Floor}(\text{Abs}(x) + 0.5)$$

$$\text{Sign}(x) = \begin{cases} 1 & ; \ x > 0 \\ 0 & ; \ x == 0 \\ -1 & ; \ x < 0 \end{cases}$$

Sin(x) the trigonometric sine function operating on an argument x in units of radians $$\text{Sqrt}(x) = \sqrt{x}$$

$$\text{Swap}(x, y) = (y, x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table) operations (with operands x, y, and z)

```
"x++", "x- -"
"!x", "-x" (as a unary prefix operator)
x^y
"x * y", "x / y", "x ÷ y", "x/y" "x % y"
"x + y", "x - y" (as a two-argument operator),
```
$$\sum_{i=x}^{y} f(i)$$
```
"x << y", "x >> y"
"x < y", "x <= y", "x > y", "x >= y"
"x == y", "x != y"
"x & y"
"x | y"
"x && y"
"x | | y"
"x ? y : z"
"x..y"
"x = y", "x += y", "x -= y"
```

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:

... as follows/ ... the following applies:

If condition 0, statement 0

Otherwise, if condition 1, statement 1

...

Otherwise (informative remark on remaining condition), statement n

Each "If ... Otherwise, if ... Otherwise, ... " statement in the text is introduced with " ... as follows" or " ... the following applies" immediately followed by "If ... ". The last condition of the "If . . . Otherwise, if . . . Otherwise, ... " is always an "Otherwise, ... ". Interleaved "If ... Otherwise, if ... Otherwise, ... " statements can be identified by matching " . . . as follows" or " . . . the following applies" with the ending "Otherwise, ... ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:

... as follows/ ... the following applies:

If all of the following conditions are true, statement 0:

condition 0a condition 0b

Otherwise, if one or more of the following conditions are true, statement 1:

condition 1a condition 1b

....

Otherwise, statement n

In the text, a statement of logical operations as would be described mathematically in the following form:

```
if ( condition 0 )
    statement 0
if ( condition 1 )
    statement 1
``` may be described in the following manner:

When condition 0, statement 0

When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of coding implemented by a decoding device, the method comprising:
receiving a bitstream;
obtaining from the bitstream, a first luma bit depth value of luma samples of a current picture;
performing a Hadamard Transform Domain Filtering (HTDF) post reconstruction filtering of a block of the current picture by using a lookup table (LUT) based on the obtained first luma bit depth value,
wherein the following formula is used in the following way depending on the bit depth value:

If $bitDepth < 10$ $bdShift = 10 - bitDepth$ $$fHadFilt[i] = \begin{cases} fHad[i]; \text{Abs}(fHad[i]) << bdShift >= aTHR \\ bLUT\big[(fHad[i] << bdShift + \\ (1 << (tblShift - 1))) >> tblShift\big] >> bdShift; \\ fHad[i] > 0, \text{Abs}(fHad[i]) << bdShift < aTHR \\ -(bLUT[((-fHad[i]) << bdShift + \\ (1 << (tblShift - 1))) >> tblShift] >> bdShift); \\ fHad[i] <= 0, \text{Abs}(fHad[i]) << bdShift < aTHR \end{cases}$$

otherwise $bdShift = bitDepth - 10$ $$fHadFilt[i] = \begin{cases} fHad[i]; \text{Abs}(fHad[i]) >> bdShift >= aTHR \\ bLUT\big[(fHad[i] >> bdShift + \\ (1 << (tblShift - 1))) >> tblShift\big] << bdShift; \\ fHad[i] > 0, \text{Abs}(fHad[i]) >> bdShift < aTHR \\ -(bLUT[((-fHad[i]) >> bdShift + \\ (1 << (tblShift - 1))) >> tblShift] << bdShift); \\ fHad[i] <= 0, \text{Abs}(fHad[i]) >> bdShift < aTHR \end{cases}$$

wherein i=1 . . . 3, and variables THR and tblShift are derived based on the luma quantization parameter $Qp_Y$;
wherein fHad[i] represents a Hadamard spectrum component,
wherein fHadFilt represents filtered Hadamard spectrum components,
wherein aTHR represents a predefined threshold value.

2. The method according to the claim 1, wherein performing the HTDF post reconstruction filtering of the block of the current picture by using the LUT based on the obtained first luma bit depth value comprises:
obtaining a second luma bit depth value by adding 8 to the first luma bit depth value; and
performing the HTDF post reconstruction filtering of the block of the current picture using the LUT based on the obtained second luma bit depth value.

3. The method according to the claim 2, wherein performing the HTDF post reconstruction filtering of the block of the current picture by using the LUT based on the obtained second luma bit depth value comprises:
based on determining that the second luma bit depth value is less than 10, left shifting an input value of the LUT by [10–second luma bit depth value] bits; and
based on determining that the second luma bit depth value is equal to or greater than 10, right shifting the input value of the LUT by [second luma bit depth value–10] bits.

4. The method of claim 2, wherein the obtained second luma bit depth value is one of 8-16 bits.

5. The method according to claim 2, wherein the performing the HTDF post reconstruction filtering of the block of the current picture by using the LUT based on the obtained first luma bit depth value, comprises:
based on determining that the obtained second luma bit depth value is not a third luma bit depth value, performing the HTDF post reconstruction filtering of the block by using the LUT, wherein an input of the LUT is normalized based on the obtained second luma bit depth value, and an output of the LUT is normalized based on the obtained second luma bit depth value, wherein the obtained second luma bit depth value is obtained based on the obtained first luma bit depth value; or
based on determining that the obtained first luma bit depth value is the third luma bit depth value, performing the HTDF post reconstruction filtering of the block by using the LUT, wherein an input of the LUT is not normalized, and an output of the LUT is not normalized.

6. The method according to claim 2, wherein the step of performing the HTDF post reconstruction filtering of the block of the current picture, comprises:
loading a current pixel of a reconstructed block or an extended reconstructed block including the current pixel and neighboring pixels of the current pixel according to a predefined scan template;

obtaining Hadamard spectrum components by performing a Hadamard transform for the current pixel or the current pixel and the neighboring pixels;
obtaining filtered Hadamard spectrum components based on the obtained Hadamard spectrum components by using the LUT based on the obtained second luma bit depth value, wherein an input of the LUT is normalized based on the obtained second luma bit depth value, and an output of the lookup table is normalized based on the obtained second luma bit depth value, to obtain the filtered Hadamard spectrum components;
obtaining filtered pixels by performing an inverse Hadamard transform on the filtered Hadamard spectrum components; and
generating a filtered reconstructed block based on the filtered pixels.

7. The method according to claim 6, wherein obtaining the filtered Hadamard spectrum components, comprises:
performing a conditional check of normalized Hadamard spectrum components and a predefined threshold value;
based on determining that the conditional check is satisfied, deriving output filtered Hadamard spectrum components by using the LUT based on an LUT element index, wherein the LUT element index is derived based on the normalized Hadamard spectrum components; and
performing a normalization of the output filtered Hadamard spectrum components to obtain the filtered Hadamard spectrum components.

8. A method of coding implemented by a decoding device, the method comprising:
receiving a bitstream;
obtaining from the bitstream, a first luma bit depth value of luma samples of a current picture;
performing a Hadamard Transform Domain Filtering (HTDF) post reconstruction filtering of a block of the current picture by using a lookup table (LUT) based on the obtained first luma bit depth value
wherein performing the HTDF post reconstruction filtering of the block of the current picture by using the LUT based on the obtained first luma bit depth value comprises:
obtaining a second luma bit depth value by adding 8 to the first luma bit depth value; and
performing the HTDF post reconstruction filtering of the block of the current picture using the LUT based on the obtained second luma bit depth value
wherein based on determining that the obtained second luma bit depth is 12 bits, the following formula is used to obtain filtered Hadamard spectrum components:

11. The method according to the claim 9, wherein the third luma bit depth value is 10.

12. The method according to claim 9, wherein the LUT is used for a plurality of luma bit depth values not smaller than the third luma bit depth value.

13. The method according to claim 1, wherein the LUT is used for 10 bits luma bit depth value, 8 bits luma bit depth value, or 12 bits luma bit depth value.

14. The method according to claim 1, wherein performing the HTDF post reconstruction filtering of the block of the current picture, comprises:
based on determining that at least one condition is satisfied, performing the HTDF post reconstruction filtering of the block of the current picture using the lookup table based on a formula which is associated with the obtained first luma bit depth value; or
based on determining that at least one condition is satisfied, performing the HTDF post reconstruction filtering of the block of the current picture by using the LUT based on the obtained first luma bit depth value.

15. The method according to claim 14, wherein the at least one condition is based on a comparison result between a scaled Hadamard spectrum component and a predefined threshold value; or
when a scaled Hadamard spectrum component is less than a predefined threshold value the condition is satisfied.

16. The method according to claim 1, wherein the lookup table is obtained based on a quantization parameter of the block.

17. A decoder, the decoder comprising:
one or more processors; and
a non-transitory computer-readable storage medium coupled to processors and storing programming for execution by the processors, wherein the programming, when executed by the processors, configures the decoder to carry out the method according to claim 1.

18. A non-transitory computer-readable medium carrying a program code which, when executed by a computer device, causes the computer device to perform the method of claim 1.

19. A method of coding implemented by a decoding device, the method comprising:
receiving a bitstream;
obtaining from the bitstream, a first luma bit depth value of luma samples of a current picture;
performing a Hadamard Transform Domain Filtering (HTDF) post reconstruction filtering of a block of the current picture by using a lookup table (LUT) based on the obtained first luma bit depth value, wherein per- $$fHadFilt[i] = \begin{cases} fHad[i]; \text{Abs}(fHad[i]) >> 2 >= aTHR \\ bLUT[(fHad[i] >> 2 + (1 << (tblShift - 1))) >> tblShift] << 2; fHad[i] > 0, \text{Abs}(fHad[i]) >> 2 < aTHR \\ -bLUT[((-fHad[i]) >> 2 + (1 << (tblShift - 1))) >> tblShift] << 2); fHad[i] <= 0, \text{Abs}(fHad[i]) >> 2 < aTHR \end{cases}$$

wherein i=1 . . . 3, and variables THR and tblShift are derived based on a luma quantization parameter $Qp_Y$;
wherein fHad[i] represents a Hadamard spectrum component,
wherein fHadFilt represents the filtered Hadamard spectrum components,
wherein aTHR represents a predefined threshold value.

9. The method according to claim 1, wherein the LUT is predefined or designed for a third luma bit depth value.

10. The method according to claim 9, wherein the LUT is used for a plurality of luma bit depth values smaller than the third luma bit depth value.

forming the HTDF post reconstruction filtering of the block of the current picture by using the LUT based on the obtained first luma bit depth value comprises:
obtaining a second luma bit depth value by adding 8 to the first luma bit depth value; and
performing the HTDF post reconstruction filtering of the block of the current picture using the LUT based on the obtained second luma bit depth value,
wherein based on determining that the obtained second luma bit depth value is 8 bits, the following formula is used to obtain filtered Hadamard spectrum components:

$$fHadFilt[i] = \begin{cases} fHad[i]; \text{Abs}(fHad[i]) << 2 >= aTHR \\ bLUT\big[\big(fHad[i] << 2 + \big(1 << (tblShift-1)\big)\big) >> tblShift\big] >> 2; fHad[i] > 0, \text{Abs}(fHad[i]) << 2 < aTHR \\ -bLUT\big[\big(\big(-fHad[i] << 2 + \big(1 << (tblShift-1)\big)\big) >> tblShift\big] >> 2\big); fHad[i] <= 0, \text{Abs}(fHad[i]) << 2 < aTHR \end{cases}$$

wherein i=1 . . . 3, and variables THR and tblShift are derived based on a luma quantization parameter $Qp_Y$, wherein fHad[i] represents a Hadamard spectrum component, wherein fHadFilt represents the filtered Hadamard spectrum components, wherein aTHR represents a predefined threshold value.

* * * * *